(12) United States Patent
Drescher et al.

(10) Patent No.: US 9,557,419 B2
(45) Date of Patent: Jan. 31, 2017

(54) METHODS FOR GENERATING ACCURACY INFORMATION ON AN IONOSPHERE MODEL FOR SATELLITE NAVIGATION APPLICATIONS

(71) Applicant: Trimble Navigation Limited, Sunnyvale, CA (US)

(72) Inventors: Ralf Drescher, Hohenkirchen (DE); Xiaoming Chen, Hohenkirchen (DE)

(73) Assignee: Trimble Inc., Sunnyvale, CA (US)

( * ) Notice: Subject to any disclaimer, the term of this patent is extended or adjusted under 35 U.S.C. 154(b) by 760 days.

(21) Appl. No.: 14/101,119

(22) Filed: Dec. 9, 2013

(65) Prior Publication Data

US 2014/0292573 A1    Oct. 2, 2014

Related U.S. Application Data

(60) Provisional application No. 61/738,953, filed on Dec. 18, 2012.

(51) Int. Cl.
*G01S 19/13* (2010.01)
*G01S 19/07* (2010.01)

(52) U.S. Cl.
CPC ............... *G01S 19/13* (2013.01); *G01S 19/07* (2013.01)

(58) Field of Classification Search
USPC ............ 342/357.21, 357.23, 357.44, 357.46, 342/357.51; 701/469, 484
See application file for complete search history.

(56) References Cited

U.S. PATENT DOCUMENTS

| | | |
|---|---|---|
| 5,477,458 A | 12/1995 | Loomis |
| 5,828,336 A | 10/1998 | Yunck et al. |
| 5,899,957 A | 5/1999 | Loomis |
| 7,432,853 B2 | 10/2008 | Vollath |
| 2012/0162007 A1 | 6/2012 | Leandro et al. |
| 2013/0044026 A1 | 2/2013 | Chen et al. |

FOREIGN PATENT DOCUMENTS

| | | |
|---|---|---|
| CN | 101419274 A | 4/2009 |
| DE | 10 2012 202 095 A1 | 8/2012 |
| WO | 2011/034614 A2 | 3/2011 |

OTHER PUBLICATIONS

Peter Joosten and Christian Tiberius, "Fixing the ambiguities—are you sure they are right?", in GPS World (2000), vol. 11, No. 5, pp. 46-51.

(Continued)

*Primary Examiner* — Dao Phan
(74) *Attorney, Agent, or Firm* — Kilpatrick Townsend & Stockton LLP

(57) ABSTRACT

Accuracy information for an ionosphere model is generated. Phase residual information of a parameter estimation procedure is obtained and coordinates of pierce points are computed on a sphere around the earth. The coordinates indicate where signals pierce the sphere. Phase residual information is mapped for each pierce point. A grid of equidistant points is put on the sphere and the pierce points are identified. For each selected grid point, vertical accuracy information is computed based on vertical residual information, and a scale factor is computed based on the vertical accuracy information. The accuracy information for the ionosphere model is generated based on the vertical accuracy information computed for the selected grid points and an overall scale factor computed based on computed scale factors.

20 Claims, 14 Drawing Sheets

(56) References Cited

OTHER PUBLICATIONS

Yang Gao, "Precise Point Positioning and Its Challenges", Inside GNSS (2006), vol. 1, No. 8, pp. 16-18.

Ahmadi, R., G. S. Becker, S.R. Peck, F. Choquette, T.F. Garard, A.J. Mannucci, B. A. Iijima, and A. W. Moore (1997): "Validation analysis of the WAAS GIVE and UIVE Algorithms". Proceedings of the 53rd Annual Meeting, Inst. of Navigation, Alexandria, Va, 10 pages.

Mannucci, A. J., Wilson, B. D, Edwards, C. D. (1993): "A New Method for Monitoring the Earth's Ionospheric Total Electron Content Using the GPS Global Network". Proceedings of ION GPS-93, pp. 1323-1332.

Harris, I. L., A.J. Mannucci, B.A. Iijima, U. J. Lindqwister, D. Muna, X. Pi and B. D. Wilson (2001): "Ionospheric specification algorithms for precise GPS-based aircraft navigation", Radio Science, vol. 36, No. 2, pp. 287-298, Mar./Apr. 2001.

Schaer S. (1999): "Mapping and Predicting the Earth's Ionosphere Using the Global Positioning System", Dissertation, Geodätisch-geophysikalische Arbeiten in der Schweiz, vol. 59, 228 pages.

Strang G. and Borre K. (1997): "Linear algebra, geodesy, and GPS", Wellesley-Cambridge Press, Wellesley MA, USA, 324 pages.

Ahmadi, R. et al., "Validation Analysis of the WAAS GIVE and UIVE Algorithms," *Proceedings of the 53$^{rd}$ Annual Meeting of the Institute of Navigation*, Jun. 30, 1997, vol. 2, Albuquerque, NM, pp. 441-450.

Komjathy, A. et al., "An Assessment of the Current WAAS Ionospheric Correction Algorithm in the South American Region," NASA Jet Propulsion Laboratory/California Institute of Technology, Pasadena, California, Received Sep. 2002, Revised Jul. 2003, pp. 193-204.

Sakai, T. et al., "Mitigating Ionospheric Threat Using a Dense Monitoring Network," ION GNSS 20$^{th}$ International Technical Meeting of the Satellite Division, 25-28, Sep. 2007, Fort Worth, TX, pp. 927-938.

METHODS FOR GENERATING ACCURACY INFORMATION ON AN IONOSPHERE MODEL FOR SATELLITE NAVIGATION APPLICATIONS

RELATED APPLICATIONS

This application claims priority to U.S. Provisional Application No. 61/738,953, filed Dec. 18, 2012, the contents of which are incorporated herein by reference in their entirety for all purposes.

TECHNICAL FIELD

The invention relates to the field of satellite navigation systems. More particularly, the invention relates to methods and apparatus for processing satellite navigation observations in order to model the ionosphere, i.e. its effects on electromagnetic signals, and to generate accuracy information associated with an ionosphere model. The accuracy information may for example be used for satellite navigation applications, such as for example for precise point positioning.

BACKGROUND

Global Navigation Satellite Systems (GNSS) include for example the Global Positioning System (GPS), the GLONASS system, the Galileo system, the COMPASS system, and others.

In the context of GPS for example, each satellite transmits continuously using two radio frequencies in the L-band, referred to as L1 and L2, at respective frequencies of 1575.42 MHz and 1227.60 MHz. With the ongoing modernization of the GPS, it is currently planned to use a third frequency referred to as L5 frequency at 1176.45 MHz. Two signals are transmitted on L1, one for civil users and the other for users authorized by the United States Department of Defense (DoD). One signal is transmitted on L2, intended only for DoD-authorized users, but which can be received by civil users with suitably equipped receivers. More recent GPS satellites also transmit a second signal on L2 for civil users. Each GPS signal has a carrier at the L1 and L2 frequency, a pseudo-random number (PRN) code, and a navigation message containing information about the satellite orbit, the satellite health status, various correction data, status messages and other data messages. Two different PRN codes are transmitted by each satellite: a coarse acquisition (C/A) code and a precision (P/Y) code which is encrypted for DoD-authorized users. Each C/A code is a unique sequence of 1023 bits, which is repeated each millisecond.

Other GNSS systems likewise have satellites which transmit multiple signals on multiple carrier frequencies.

FIG. 1 schematically illustrates a prior-art GNSS scenario 100. Receiver 110 receives GNSS signals from any number of satellites in view, such as from satellites 120, 130 and 140. The signals pass through the earth's ionosphere 150 and through the earth's troposphere 160. Each signal has multiple carrier frequencies, such as for example frequencies L1 and L2. Receiver 110 determines from the signals respective approximate (apparent) distances to the satellites (so called pseudo-ranges, PR1, PR2, . . . , PRm). Pseudo-range determinations are distorted by signal-path variations resulting from passage of the signals through the ionosphere 150 and the troposphere 160, and from multipath effects, as schematically illustrated by reference 170 on FIG. 1. Pseudo-ranges can be determined using the C/A code with an error of about one meter. However, the phases of the L1 and L2 carriers can be measured with an accuracy of 0.01-0.05 cycles (corresponding to pseudo-range errors of 2 mm to 1 cm). Phase measurements of the carriers are influenced by the dispersive effects of the ionosphere, which vary over time.

Due to the much higher accuracy, the processing of the phase observations is advantageous for precise GNSS positioning. However, a complication arises in that the exact number of cycles between the receiver and the satellite is a priori unknown. More specifically, the phase observations are ambiguous by an ambiguity term which is a product of an unknown integer number and the wavelength of the carrier signal. To handle these unknown integers, they can simply be estimated as floating-point numbers within the GNSS parameter estimation. The corresponding position result is called a float solution. The float solution can be improved by fixing the estimated floating-point numbers to integer values by corresponding known methods (e.g. the LAMBDA method). The GNSS parameter estimation can afterwards be recomputed with the fixed integer values for the integer ambiguities. By doing so, the number of unknowns is reduced drastically and the accuracy of the positioning result with the fixed solution is better than with the float solution (see Peter Joosten and Christian Tiberius, "*Fixing the ambiguities—are you sure they are right?*", in GPS World (2000), Vol. 11, No. 5, pp. 46-51).

For certain applications, artificial observations can be computed from the original ones by forming linear combinations from the observations. This is true both for the code and the phase observations. Such linear combinations have different properties compared to the original observations. Popular linear combinations are the Melbourne-Wuebbena (MW) linear combination, the widelane linear combination, the geometric-free linear combination (also called ionospheric linear combination) and the ionospheric-free linear combination (also called geometric linear combination). Their properties are beneficial with respect to dedicated applications (see for example WO2011/034614 A2). For example, the MW linear combination eliminates the effect of the ionosphere, of the geometry, of the clocks, and of the troposphere, the geometric-free linear combination is independent of receiver clocks and geometry (orbits, station coordinates), and the ionospheric-free linear combination eliminates the first-order effect of the ionospheric path delay.

GNSS positioning accuracy is generally limited by measurement errors that can be classified as either common mode or noncommon mode. Common-mode errors have nearly identical effects on all receivers operating in a limited geographic area (e.g. 50 km). Noncommon-mode errors are distinct even for two receivers with minimal antenna separation. Relative positioning allows common-mode errors to be mitigated by differencing the observations of the rover with observations of a reference station at a known location near the rover, e.g., within 50-100 km. The reference station observations can be collected at a physical base station or estimated from observations of a network of reference stations (see for example U.S. Pat. No. 5,477,458 and U.S. Pat. No. 5,899,957).

Another way to obtain accurate positioning results is to use a technique is known as precise point positioning (PPP), also called absolute positioning, which uses a single GNSS receiver together with precise satellite orbit and clock data to reduce satellite-related error sources. A dual-frequency receiver can remove the first-order effect of the ionosphere by using the ionospheric-free linear combination. Afterwards, position solutions are accurate in a range of centimeters to decimeters. The utility of PPP is limited by the need to wait longer than desired for the float position solution to converge to centimeter accuracy. This waiting time is called convergence time. In contrast to relative positioning techniques in which common-mode errors are eliminated by differencing of observations using reference stations, PPP processing uses undifferenced carrier-phase observations so that the ambiguity terms are corrupted by satellite and receiver phase biases. Methods have been proposed in the prior art for integer ambiguity resolution in PPP processing (see for example WO2011/034614 A2 and Yang Gao, "*Precise Point Positioning and Its Challenges*", Inside GNSS (2006), Vol. 1, No. 8, pp. 16-18).

A conventional way to deal with the problems of PPP is described in international application WO 2011/034614 A2. This involves generating synthetic base station data which preserves the integer nature of carrier phase data. A set of corrections is computed per satellite (a MW-bias, a code leveled clock error and a phase leveled clock error) from global network data. Using these corrections, a rover can use the MW-combination to solve widelane ambiguities and use ionospheric-free code/phase observations to solve the N1 (narrowlane) ambiguities. With fixed ambiguities, the rover can achieve cm-level accuracy positioning in real-time, meaning that there is an action (e.g., data is processed, results are computed) as soon as the required information for that action is available. The advantage of this approach is that it is insensitive to ionospheric activity, the disadvantage is that the convergence time is longer than desired.

In order to improve the convergence time, US patent publication No. 2013/0044026, filed Feb. 13, 2012 (and incorporated herein by reference in its entirety for all purposes), describes a method to make use of an ionosphere model and further derive an ionospheric phase bias per satellite in addition to other corrections (a MW-bias, a code leveled clock error and a phase leveled clock error) to generate synthetic base station data. The synthetic base station data generated with this approach preserves the integer nature of carrier phase data, and it can be used for both single and dual frequency rovers. This approach requires an ionosphere model in general, and the rover convergence time depends heavily on the accuracy of the ionosphere model provided. Therefore, it is necessary to provide not only the ionosphere model itself but also its accuracy to the methods and apparatus for the GNSS data processing.

One way to provide a rover with an ionosphere model and information on the accuracy of the ionosphere model is a satellite based augmentation system (SBAS). A SBAS is a system that supports wide-area or regional augmentation through the use of additional satellite-broadcast messages. Such systems are commonly composed of multiple ground stations, located at accurately-surveyed points. The ground stations take measurements of one or more of the GNSS satellite signals and other environmental factors which may impact the signals received by the users. Using these measurements, information messages are created and sent to one or more satellites for broadcast to the end users. Especially, a SBAS provides correction data to increase the integrity and accuracy of a single frequency, code based positioning with GNSS whereas the correction data are broadcasted by communication satellites and can be received directly with the GNSS receiver. There are several SBAS running, such as e.g. WAAS (Wide Area Augmentation System) in North America and EGNOS (European Geostationary Navigation Overlay Service) in Europe.

The main application of SBAS is precise and reliable GNSS-based aircraft navigation. Single frequency, code based positioning devices can benefit from SBAS. After applying SBAS corrections, the positioning accuracy is in the meter range. Within the SBAS framework, ionospheric vertical delays (i.e. the ionospheric delay for a signal travelling vertically through the ionosphere) at geographically fixed ionospheric grid points (IGPs) are provided. In addition to these vertical delays, the SBAS message contains grid ionospheric vertical errors (GIVEs) for the IGPs (see for example Ahmadi, R., G. S. Becker, S. R. Peck, F. Choquette, T. F. Garard, A. J. Mannucci, B. A. Iijima, and A. W. Moore (1997): "*Validation analysis of the WAAS GIVE and UIVE Algorithms*". Proceedings of the $53^{rd}$ Annual Meeting, Inst. Of Navigation, Alexandria, Va.).

U.S. Pat. No. 5,828,336 presents a method and a device for providing real-time wide-area differential GPS signals to allow users with a GPS receiver to obtain improved GPS positioning. The ionosphere correction system in this document uses a real-time Kalman filter to compute sun-fixed ionospheric delay maps and the associated formal error maps. The formal error map can be used to evaluate the quality of the ionospheric correction broadcast to the user, and to block the broadcast of suspect data. The formal error is determined by the total electron content (TEC) data weights, the observation geometry, the data equation, and the random-walk standard deviation (see Mannucci, A. J., Wilson, B. D, Edwards, C. D. (1993): "A *New Method for Monitoring the Earth's Ionospheric Total Electron Content Using the GPS Global Network*". Proceedings of ION GPS-93, pp. 1323-1332).

Harris, I. L., A. J. Mannucci, B. A. Iijima, U. J. Lindqwister, D. Muna, X. Pi and B. D. Wilson (2001): "*Ionospheric specification algorithms for precise GPS-based aircraft navigation*", Radio Science, Volume 36, Number 2, pp. 287-298, March/April 2001 discloses a method of grid ionospheric vertical error (GIVE) computation. It is a combination of a Kalman-filter based statistical error derived solely from the measurement system (which is the formal error map described in U.S. Pat. No. 5,828,336 times several scale factors), and error due to the spatial decorrelation of the ionosphere and error from converting the vertical corrections to slant paths. GIVE values are required to bound the actual error with 99.9% confidence to meet the requirement of integrity and accuracy. The scaling factors and the two additional error contributions considered in the GIVE values improve the agreement between the provided error indicator and the true error (compared to the previous approach in Mannucci, A. J., Wilson, B. D, Edwards, C. D. (1993): "*A New Method for Monitoring the Earth's Ionospheric Total Electron Content Using the GPS Global Network*". Proceedings of ION GPS-93, pp. 1323-1332). Nevertheless, the GIVE is mainly based on the formal errors and therefore a direct reference to the true error of the provided delay is not given.

In view of the above, the present invention aims at providing improved accuracy information of an ionosphere model in real-time, so that the accuracy information can be efficiently used for GNSS positioning applications.

SUMMARY OF THE INVENTION

To achieve or at least partially achieve the above-mentioned aim, methods, processing entities, and computer programs according to the invention are defined in the independent claims. Particular embodiments are defined in the dependent claims, and are explained in the present description.

In one embodiment, a method is carried out by a computer or set of computers, for generating accuracy information for an ionosphere model. The ionosphere model is calculated using a parameter estimation procedure based on phase observations made using a plurality of ground stations. In the parameter estimation procedure, each phase observation is obtained from at least two signals transmitted from a satellite to a ground station, each of the at least two signals having a different frequency. The accuracy information is usable in a GNSS positioning system for estimating a position of a rover. The method comprises the following steps. For each of at least some of the phase observations having fixed or converged ambiguities, phase residual information of the parameter estimation procedure is obtained and coordinates of a pierce point are computed on a sphere around the earth. The sphere is defined by an ionosphere single layer model. The coordinates indicate where the path of the signals from which the phase observation has been obtained pierces the sphere. Then the phase residual information of the corresponding phase observation is mapped, for each pierce point, to the vertical at the pierce point to generate vertical residual information. Furthermore, for each of at least some of the points of an equidistant grid on the sphere, each point being hereinafter referred to as "grid point", pierce points are identified within a threshold distance from the grid point on the sphere. Then grid points are selected for which the number of identified pierce points exceeds a threshold number. For each selected grid point, vertical accuracy information is computed at the selected grid point based on the vertical residual information of the identified pierce points, and a scale factor is computed based on the vertical accuracy information computed for the selected grid point. Finally, the accuracy information for the ionosphere model is generated based on the vertical accuracy information computed for the selected grid points and an overall scale factor computed based on the computed scale factors.

The method enables to improve the accuracy information of an ionosphere model by making use of carrier phase observations having fixed or converged ambiguities. In other words, the fixed or converged ambiguities offer the possibility to provide residuals to the estimated ionosphere model which could be considered as quasi-true (in the range of a few centimeters). Therefore, the convergence times of a rover station provided with the accuracy information is thus significantly reduced compared to prior art methods.

Especially, phase observations having fixed or converged ambiguities are used to generate the accuracy information. By doing so, it can be ensured that the generated accuracy information is of sufficient quality.

Furthermore, the method takes into account that the ionosphere is quite inhomogeneous due to, for example, sun activity and therefore also large model errors with respect to the true ionospheric delay arise in certain areas. In other words, there are large residuals from the parameter estimation in certain areas. Conventional approaches such as GIVE providing accuracy information for an ionosphere model rely on the standard deviation of the parameter estimation. However, the standard deviation does not properly reflect large inhomogeneities in the residuals since the standard deviation is only influenced by the overall residuals.

The present invention provides improved accuracy information which properly reflects the true errors of the ionosphere model. Especially, certain grid points (the selected grid points) are singled out because the number of nearby pierce points is sufficient to calculate vertical accuracy information at each selected grid point based on the vertical residual information of the identified pierce points within the threshold distance. Furthermore, a scale factor is computed for each selected grid point.

Finally, the accuracy information for the ionosphere model is generated based on the vertical accuracy information computed for the selected grid points and an overall scale factor computed based on the computed scale factors. Therefore, accuracy information can notably be used for rover positioning to improve the convergence time compared to prior art methods.

Furthermore, the prior art SBAS error indicator GIVE is mainly based on the formal error and has no direct relationship to a "true" model error. In the present invention, the fixed (or sufficiently converged) ambiguities of the absolute positioning offer the possibility to provide residuals to the estimated ionosphere model which may be considered as quasi-true (in the range of a few centimeters). Therefore, the accuracy indicator from those residuals is fundamentally different from the prior art GIVE.

Moreover, the method of the present invention and accordingly the accuracy level obtained by the method is also fundamentally different from the prior art GIVE. Indeed, SBAS provides corrections to improve the single frequency, code based positioning accuracy to the range of a few meters (see for example Ahmadi, R., G. S. Becker, S. R. Peck, F. Choquette, T. F. Garard, A. J. Mannucci, B. A. Iijima, and A. W. Moore (1997): "*Validation analysis of the WAAS GIVE and UIVE Algorithms*". Proceedings of the 53$^{rd}$ Annual Meeting, Inst. Of Navigation, Alexandria, Va.) and, accordingly, integrity information. In contrast, the method of the present invention provides accuracy information related to an ionosphere model to improve the convergence time of dual frequency, phase-based positioning, wherein the resulting positioning accuracy can be in the range of centimeters.

In one embodiment, a processing entity (such as for example an apparatus, a device, a set of apparatuses, a set of devices, etc.) is used for generating accuracy information for an ionosphere model calculated using a parameter estimation procedure based on phase observations made using a plurality of ground stations, wherein each phase observation is obtained from at least two signals transmitted from a satellite to a ground station, each of the at least two signals having a different frequency, and the accuracy information is usable in a GNSS positioning system for estimating a position of a rover. The processing entity comprises an obtaining unit configured to obtain, for each of at least some of the phase observations having fixed or converged ambiguities, phase residual information of the parameter estimation procedure, and compute coordinates of a pierce point on a sphere around the earth, the sphere being defined by an ionosphere single layer model, wherein the coordinates indicate where the path of the signals from which the phase observation has been obtained pierces the sphere. The processing entity further comprises a mapping unit configured to map, for each pierce point, the phase residual information of the corresponding phase observation to the vertical at the pierce point to generate vertical residual information. The processing entity further comprises an identifying unit configured to identify, for each of at least some of the points of an equidistant grid on the sphere, each point being hereinafter referred to as "grid point", pierce points within a threshold distance from the grid point on the sphere. The processing entity further comprises a selecting unit configured to select grid points for which the number of identified pierce points exceeds a threshold number. The processing entity further comprises a computing unit configured to compute, for each selected grid point, vertical accuracy information at the selected grid point based on the vertical residual information of the identified pierce points, and a scale factor based on the vertical accuracy information computed for the selected grid point. The processing entity further comprises a generating unit configured to generate the accuracy information for the ionosphere model based on the vertical accuracy information computed for the selected grid points and an overall scale factor computed based on the computed scale factors.

DETAILED DESCRIPTION

The present invention shall now be described in conjunction with specific embodiments. The specific embodiments serve to provide the skilled person with a better understanding, but are not intended to in any way restrict the scope of the invention, which is defined by appended claims. In particular, the embodiments described independently throughout the description can be combined to form further embodiments to the extent that they are not mutually exclusive.

Figure 1:
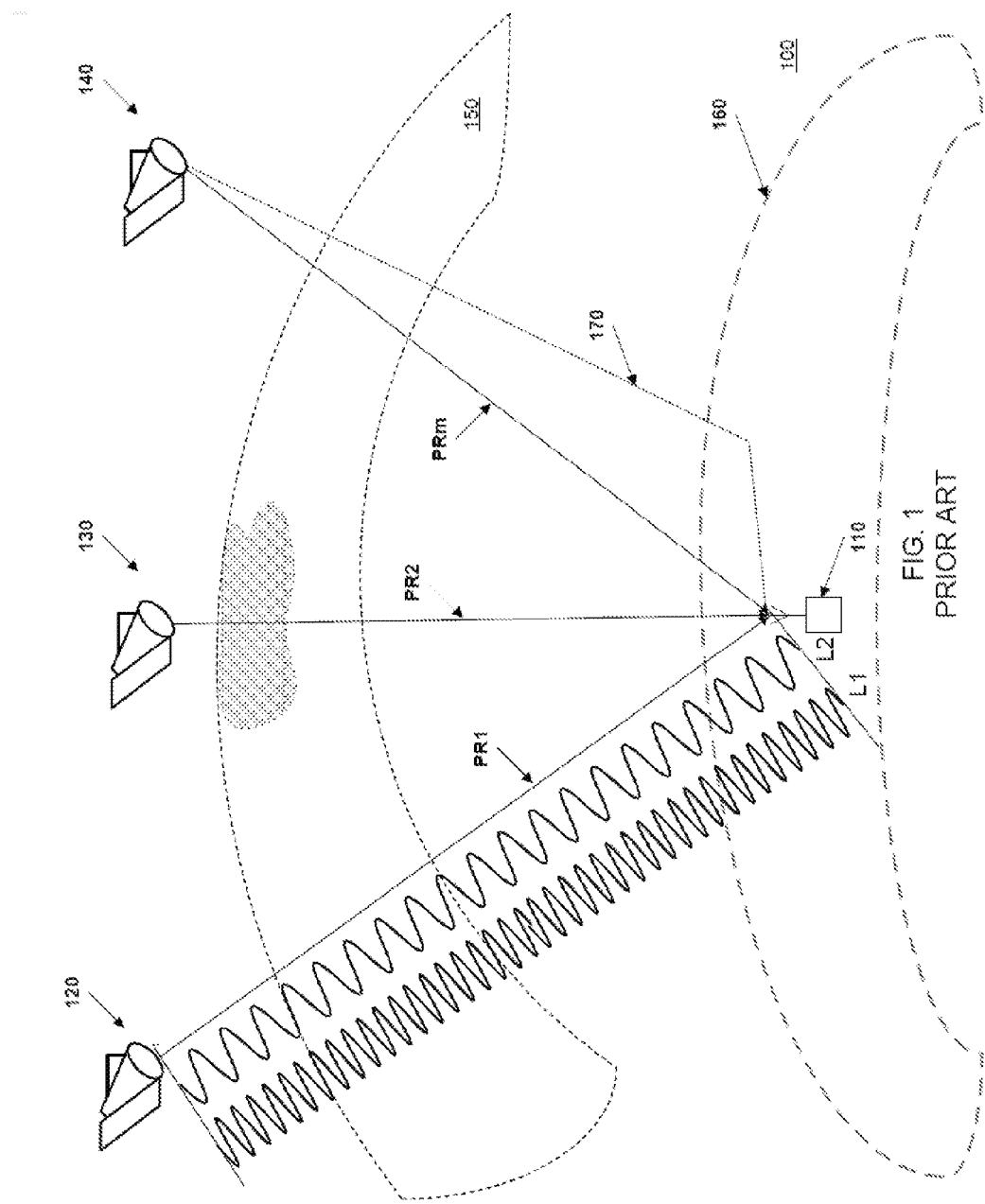
FIG. 1 schematically illustrates a prior-art scenario to determine a rover position.
Figure 2:
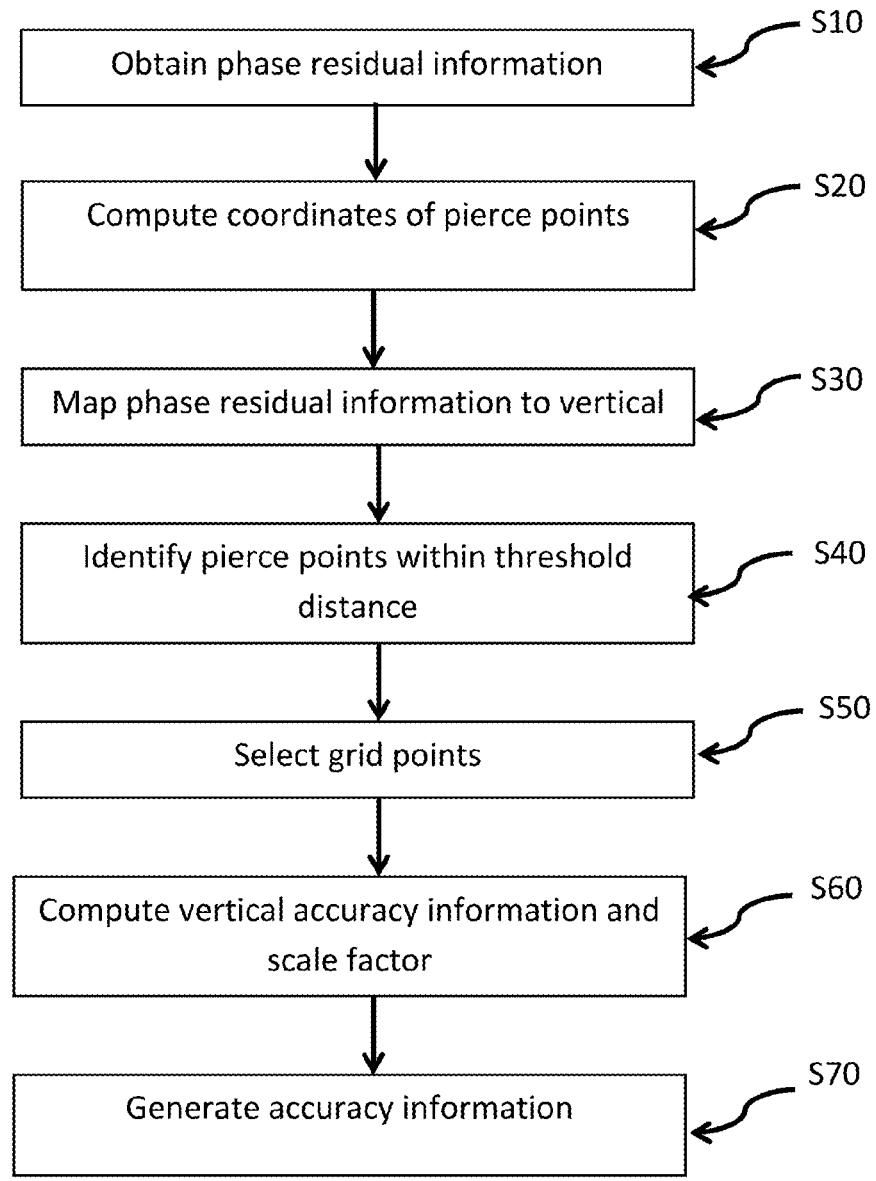
FIG. 2 is a flowchart of a method according to one embodiment of the present invention.

FIG. 2 is a flowchart of a method according to one embodiment of the present invention. The method is carried out by a computer or a set of computers. The method is used for generating accuracy information for an ionosphere model calculated using a parameter estimation procedure based on phase observations made using a plurality of ground stations. Each phase observation is obtained from at least two signals transmitted from a satellite to a ground station, each of the at least two signals having a different frequency. The accuracy information is usable in a GNSS positioning system for estimating a position of a rover.

For each of at least some of the phase observations having fixed or converged ambiguities, steps S10 and S20 are performed. In step S10, phase residual information of the parameter estimation procedure is obtained. In step S20, coordinates of a pierce point on a sphere around the earth are computed. The sphere is defined by an ionosphere single layer model, wherein the coordinates indicate where the path of the signals from which the phase observation has been obtained pierces the sphere.

In step S30, the phase residual information of the corresponding phase observation is mapped, for each pierce point, to the vertical at the pierce point to generate vertical residual information.

In step S40, for each of at least some of the points of an equidistant grid on the sphere (each point being hereinafter referred to as "grid point"), pierce points within a threshold distance from the grid point on the sphere are identified. The grid points for which the number of identified pierce points exceeds a threshold number are selected in step S50.

In step S60, two values are computed for each selected grid point: vertical accuracy information at the selected grid point based on the vertical residual information of the identified pierce points, and a scale factor based on the vertical accuracy information computed for the selected grid point.

Finally, the accuracy information for the ionosphere model is generated based on the vertical accuracy information computed for the selected grid points and an overall scale factor computed based on the computed scale factors in step S70.

In one embodiment, the ionosphere model provides the slant total electron content along a signal path through the ionosphere.

In one embodiment, the ionosphere single layer model concentrates the phase residual information of the parameter estimation procedure mapped to the vertical on the sphere. In other words, the ionosphere single layer model is used to derive the accuracy information for the (general) ionosphere model.

In one embodiment, the parameter estimation procedure comprises at least one of: a least square adjustment and a Kalman filter. However, any other suitable parameter estimation method may be used in the present invention.

In one embodiment, each phase observation is obtained from two of the at least two signals using a geometric-free linear combination. The geometric-free linear combination has the advantage that the resulting phase observation is independent of the positions of the satellite and the ground station.

In one embodiment, a phase observation has converged ambiguities if the standard deviation of the ambiguities is smaller than a threshold percentage of a cycle, the threshold percentage being a value comprised between 5% and 25%. This provides an advantage in that the accuracy information is of high quality.

In one embodiment, the distance on the sphere between adjacent grid points at the equator is equal to a value between 2 degrees and 10 degrees. This range provides an advantage in that the grid is not too coarse while the number of grid points is sufficiently low to enable real-time processing.

In one embodiment, the threshold distance in step 40 is larger than the distance between adjacent grid points. In other words, circles defined by the threshold distance overlap for different grid points.

In one embodiment, the threshold number is any one of 5, 6, 7, 8, 9, 10, 11, 12, 13, 14, and 15 in step S50.

In one embodiment, the vertical accuracy information is a weighted root mean square computed from vertical residual information of the identified pierce points. Especially, a weight might be provided by the distance between each identified pierce point and the grid point for which the vertical accuracy information is calculated.

In one embodiment, the scale factor is a ratio between the weighted root mean square and the standard deviation of the ionosphere model at the grid point, wherein the standard deviation is a result of the parameter estimation procedure. Hence, the scale factor can be used to get the weighted root mean square from the standard deviation.

In one embodiment, the overall scale factor is a weighted mean of the scale factors. For example, the number of residuals contributing to a scale factor can be used as a weight.

Figure 3:
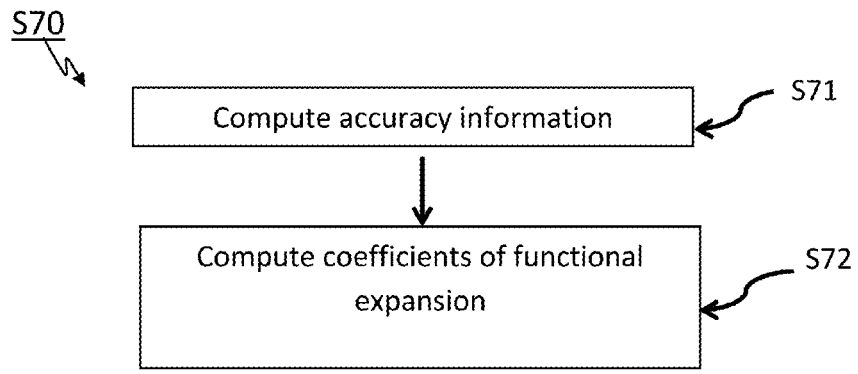
FIG. 3 is a flowchart showing steps of a method according to another embodiment of the present invention.

In one embodiment as shown in FIG. 3, step S70 further comprises computing S71, for each of all grid points of the equidistant grid, accuracy information based on the vertical accuracy information and the overall scale factor, and computing S72 coefficients of a functional expansion using a parameter estimation based on the accuracy information of each grid point to generate accuracy information covering the sphere. The functional expansion smoothes the accuracy information and provides a global representation of the accuracy information.

Figure 4:
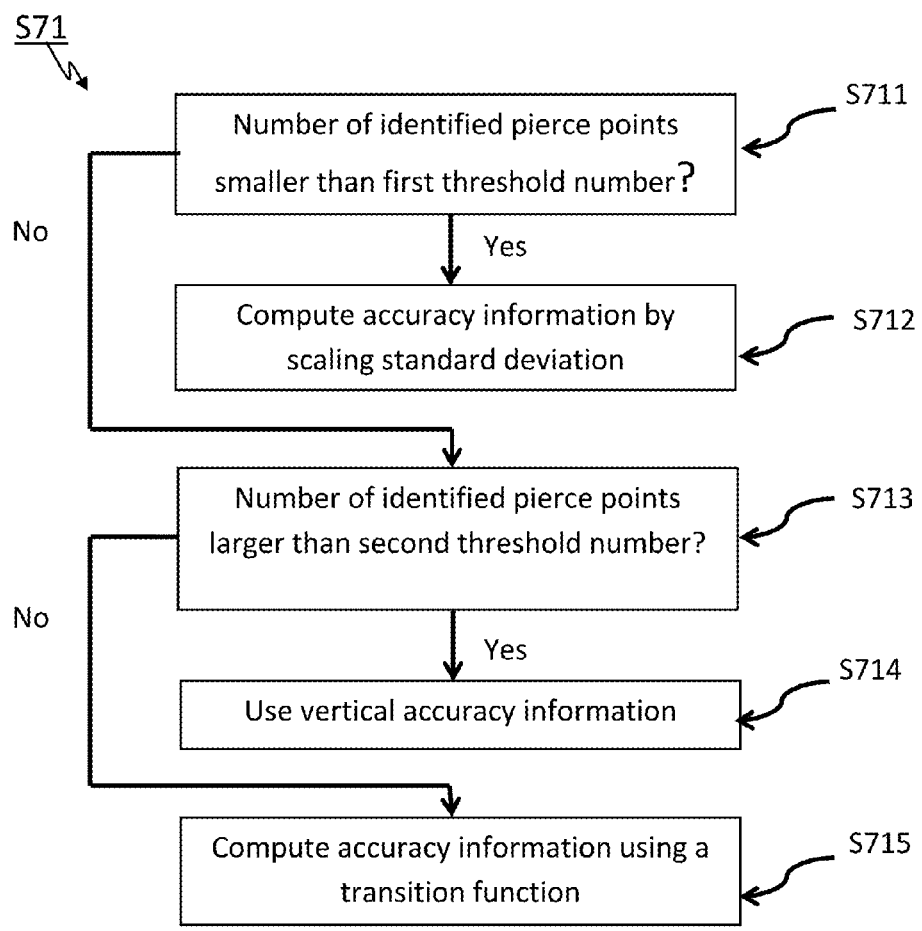
FIG. 4 is a flowchart showing steps of a method according to another embodiment of the present invention.

In one embodiment shown in FIG. 4, step S71 further comprises, if the number of identified pierce points for the grid point is smaller than a first threshold number ("yes" after step S711), computing S712 the accuracy information by scaling the standard deviation of the ionosphere model at the grid point using at least the overall scale factor. Otherwise ("no" after step S711), if the number of identified pierce points for the grid point is larger than a second threshold number ("yes" after step S713), the vertical accuracy information of the grid point is used S714 as the accuracy information. If the number of identified pierce points for the grid point is larger than or equal to the first threshold number and smaller than or equal to the second threshold number, the accuracy information is computed S715 by using a transition function between the vertical accuracy information of the grid point and the scaled standard deviation of the ionosphere model at the grid point. In this embodiment, the first threshold number is smaller than the second threshold number.

In other words, if there are enough identified pierce points for a grid point, the vertical accuracy information is used as the accuracy information since the vertical accuracy information is of sufficient quality in this case. If the number of identified pierce points is low, the overall scale factor and an additional factor depending on the number of identified pierce points are used to scale the standard deviation since the vertical accuracy information is not of sufficient quality. A transition function interpolating between these two cases is used, if the number of identified pierce points is neither too low nor high enough.

In one embodiment, the accuracy information in step S71 is computed using the following equation:

$$AI = w(n) \cdot s \cdot wScale \cdot factor(n) + (1-w(n)) \cdot wRMS,$$

wherein
AI is the accuracy information,
s is the standard deviation of the ionosphere model at the grid point,
wScale is the overall scale factor,
wRMS is the vertical accuracy information of the grid point,
n denotes the number of identified pierce points for the grid point,
n1 denotes the first threshold number,
n2 denotes the second threshold number,
$w(n)=1$ if $n<n1$,
$w(n)=0$ if $n>n2$,
$0<w(n)<1$ if $n1 \le n \le n2$, and
$1 \le factor(n) \le 3$ if $n \le n2$.

In one embodiment, the accuracy information in step S71 is computed in the same manner as in the previous paragraph except that $1 \le factor(n) \le 1.5$ if $n \le n2$.

In one embodiment, the functional expansion in step S72 is a spherical harmonic expansion.

In one embodiment, the functional expansion is a spherical harmonic expansion and the number of coefficients of the spherical harmonic expansion depends on the number of phase observations used in the parameter estimation procedure. In other words, the more phase observations are available the more coefficients can be used, whereby the quality of the accuracy information (such as, for example, an accuracy indicator) can be improved.

In one embodiment, the coefficients of the spherical harmonic expansion are sent to a user to perform a GNSS related parameter estimation, e.g. for the positioning of a rover. In contrast to SBAS where the ionosphere information is provided at dedicated grid points and subsequently an interpolation is necessary, in this embodiment of the present invention, the spherical harmonics coefficients of the accuracy information (such as, for example, the accuracy indicator) are transmitted. By equation (10), the user's rover, or any other suitable processing unit, is able to directly compute the accuracy information everywhere on the sphere layer.

In one embodiment, the accuracy information is sent to a user for the positioning of a rover.

The invention also relates to a computer program for carrying out one of the above described methods.

Figure 5:
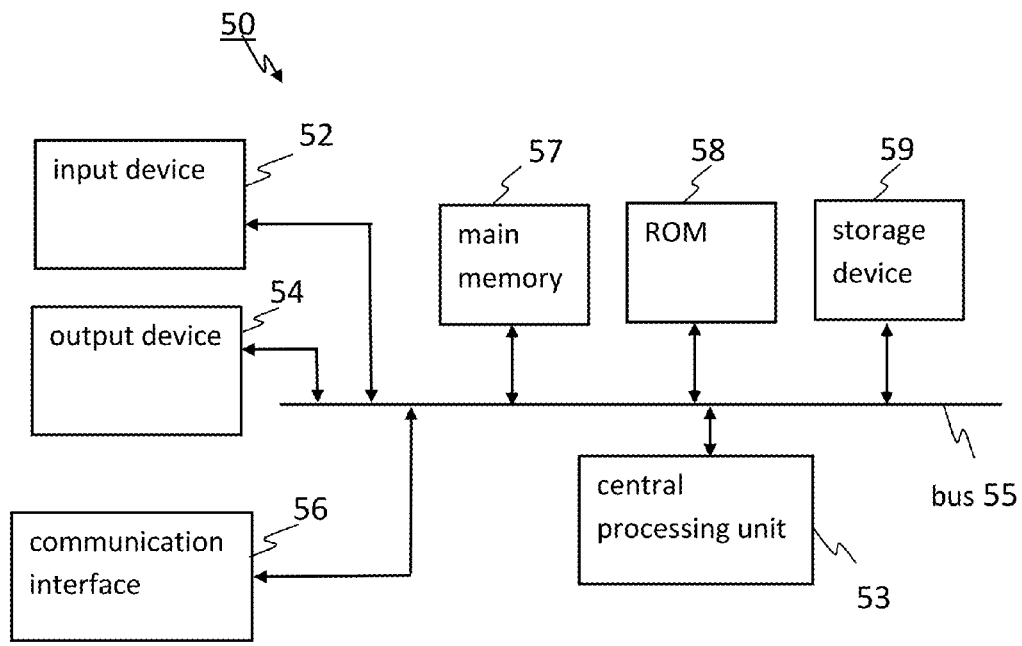
FIG. 5 schematically shows an exemplary configuration of a computer that may be used to implement a processing entity according to one embodiment of the present invention.

The invention also relates to a processing entity. FIG. 5 is a schematic diagram of an exemplary hardware implementation of a processing entity 50 that may carry out a method in accordance with embodiments of the invention. As illustrated, processing entity 50 may include a bus 55, a central processing unit (CPU) 53, a main memory 57, a ROM 58, a storage device 59, an input device 52, an output device 54, and a communication interface 56. Bus 55 may include a path that permits communication among the components of processing entity 50.

The CPU 53 may include a processor, a microprocessor, or processing logic that may interpret and execute instructions. Main memory 57 may include a RAM or another type of dynamic storage device that may store information and instructions for execution by CPU 53. ROM 58 may include a ROM device or another type of static storage device that may store static information and instructions for use by CPU 53. Storage device 59 may include a magnetic and/or optical recording medium and/or solid state medium (Flash memory) and its corresponding drive.

Input device 52 may include a mechanism that permits an operator to input information to processing entity 50, such as a keypad, a keyboard, a touch-sensitive device, a mouse, a pen, voice recognition and/or biometric mechanisms, etc. Output device 54 may include a mechanism that outputs information to the operator, including a display, a printer, a speaker, etc. Communication interface 56 may include any transceiver-like mechanism that enables processing entity 50 to communicate with other devices and/or systems. For example, communication interface 56 may include mechanisms for communicating with another device or system via a network.

The processing entity 50 may perform certain operations or processes described herein. These operations may be performed in response to CPU 53 executing software instructions contained in a computer-readable medium, such as main memory 57, ROM 58, and/or storage device 59. A computer-readable medium may be defined as a physical or a logical memory device. For example, a logical memory device may include memory space within a single physical memory device or distributed across multiple physical memory devices. Each of main memory 57, ROM 58 and storage device 59 may include computer-readable media. The magnetic and/or optical recording media (e.g., readable CDs or DVDs or Blu-ray/BDs) and/or solid state media of storage device 59 may also include computer-readable media. The software instructions may be read into main memory 57 from another computer-readable medium, such as storage device 59, or from another device via communication interface 56.

The software instructions contained in main memory 59 may cause CPU 53 to perform operations or processes described herein. Alternatively, hardwired circuitry may be used in place of or in combination with software instructions to implement processes and/or operations described herein. Thus, implementations described herein are not limited to any specific combination of hardware and software.

Figure 6:
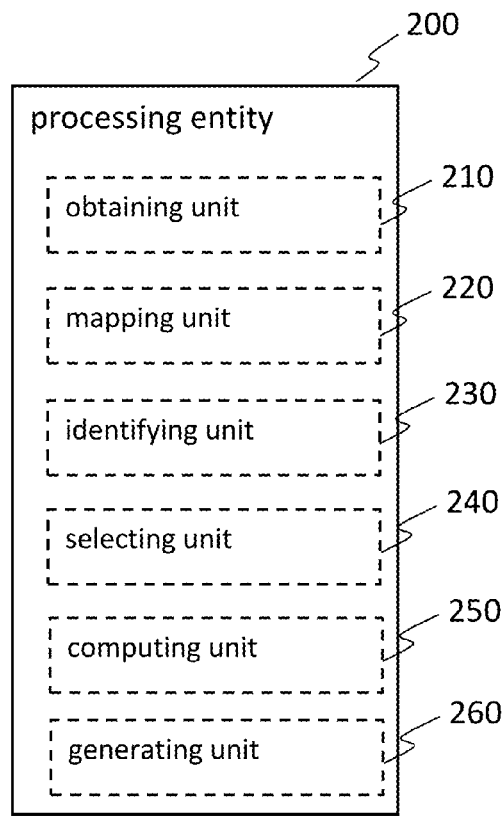
FIG. 6 schematically shows a processing entity according to one embodiment of the present invention.

FIG. 6 schematically illustrates functional units of a processing entity 200 according to one embodiment of the invention. The processing entity illustrated on FIG. 6 may for example be implemented as illustrated on FIG. 5.

The processing entity 200 is used for generating accuracy information for an ionosphere model calculated using a parameter estimation procedure based on phase observations made using a plurality of ground stations, wherein each phase observation is obtained from at least two signals transmitted from a satellite to a ground station, each of the at least two signals having a different frequency, and the accuracy information is usable in a GNSS positioning system for estimating a position of a rover. As shown in FIG. 6, the processing entity 200 comprises an obtaining unit 210 configured to obtain, for each of at least some of the phase observations having fixed or converged ambiguities, phase residual information of the parameter estimation procedure, and compute coordinates of a pierce point on a sphere around the earth, the sphere being defined by an ionosphere single layer model, wherein the coordinates indicate where the path of the signals from which the phase observation has been obtained pierces the sphere. The processing entity 200 further comprises a mapping unit 220 configured to map, for each pierce point, the phase residual information of the corresponding phase observation to the vertical at the pierce point to generate vertical residual information. The processing entity 200 further comprises an identifying unit 230 configured to identify, for each of at least some of the points of an equidistant grid on the sphere, each point being hereinafter referred to as "grid point", pierce points within a threshold distance from the grid point on the sphere. The processing entity 200 further comprises a selecting unit 240 configured to select grid points for which the number of identified pierce points exceeds a threshold number. The processing entity 200 further comprises a computing unit 250 configured to compute, for each selected grid point, vertical accuracy information at the selected grid point based on the vertical residual information of the identified pierce points, and a scale factor based on the vertical accuracy information computed for the selected grid point. The processing entity 200 further comprises a generating unit 260 configured to generate the accuracy information for the ionosphere model based on the vertical accuracy information computed for the selected grid points and an overall scale factor computed based on the computed scale factors.

In one embodiment, the ionosphere model provides the slant total electron content along a signal path through the ionosphere.

In one embodiment, the ionosphere single layer model concentrates the phase residual information of the parameter estimation procedure mapped to the vertical on the sphere.

In one embodiment, the parameter estimation procedure comprises at least one of: a least square adjustment and a Kalman filter.

In one embodiment, each phase observation is obtained from two of the at least two signals using a geometric-free linear combination.

In one embodiment, a phase observation has converged ambiguities if the standard deviation of the ambiguities is smaller than a threshold percentage of a cycle, the threshold percentage being a value comprised between 5% and 25%.

In one embodiment, the distance on the sphere between adjacent grid points at the equator is equal to a value between 2 degrees and 10 degrees.

In one embodiment, the threshold distance used by the identifying unit 230 is larger than the distance between adjacent grid points.

In one embodiment, the threshold number used by the selecting unit 240 is any one of 5, 6, 7, 8, 9, 10, 11, 12, 13, 14, and 15.

In one embodiment, the vertical accuracy information is a weighted root mean square computed from vertical residual information of the identified pierce points.

In one embodiment, the scale factor is a ratio between the weighted root mean square and the standard deviation of the ionosphere model at the grid point, the standard deviation being a result of the parameter estimation procedure.

In one embodiment, the overall scale factor is a weighted mean of the scale factors.

In one embodiment, the generating unit 260 is further configured to compute, for each of all grid points of the equidistant grid, accuracy information based on the vertical accuracy information and the overall scale factor, and compute coefficients of a functional expansion using a parameter estimation based on the accuracy information of each grid point to generate accuracy information covering the sphere.

In one embodiment, the generating unit 260 is further configured to compute: if the number of identified pierce points for the grid point is smaller than a first threshold number, the accuracy information by scaling the standard deviation of the ionosphere model at the grid point using at least the overall scale factor; if the number of identified pierce points for the grid point is larger than a second threshold number, use the vertical accuracy information of the grid point as the accuracy information; and, if the number of identified pierce points for the grid point is larger than or equal to the first threshold number and smaller than or equal to the second threshold number, the accuracy information by using a transition function between the vertical accuracy information of the grid point and the scaled standard deviation of the ionosphere model at the grid point, wherein the first threshold number is smaller than the second threshold number.

In one embodiment, the generating unit 260 is further configured to compute the accuracy information using the following equation:

$$AI = w(n) \cdot s \cdot wScale \cdot factor(n) + (1-w(n)) \cdot wRMS,$$

wherein
s is the standard deviation of the ionosphere model at the grid point,
wScale is the overall scale factor,
wRMS is the vertical accuracy information of the grid point,
n denotes the number of identified pierce points for the grid point,
n1 denotes the first threshold number,
n2 denotes the second threshold number,
$w(n)=1$ if $n<n1$,
$w(n)=0$ if $n>n2$,
$0<w(n)<1$ if $n1 \leq n \leq n2$,
$1 \leq factor(n) \leq 3$ if $n \leq n2$.

In one embodiment, the generating unit 260 is configured to compute the accuracy information in the same manner as in the previous paragraph except that $1 \leq factor(n) \leq 1.5$ if $n \leq n2$.

In one embodiment, the functional expansion is a spherical harmonic expansion.

In one embodiment, the functional expansion is a spherical harmonic expansion and the number of coefficients of the spherical harmonic expansion depends on the number of phase observations used in the parameter estimation procedure.

In one embodiment, the coefficients of the spherical harmonic expansion are sent to a user for the positioning of a rover.

In one embodiment, the accuracy information is sent to a user for the positioning of a rover.

In the following, an embodiment of the present invention will be described in more details, including additional background information when appropriate.

The Propagation of Microwaves within the Ionosphere

The ionosphere is an atmospheric layer which ranges from an altitude of approximately 60 km to an altitude of approximately 1,000 km. Within the ionosphere, the propagation velocity of microwaves depends on the extent of ionization and this extend again depends mainly on the solar radiation. As mentioned before, the effect on the signal propagation time is dispersive, i.e. it depends on the frequency of the signal. Therefore, the effect is also different for the code and the phase observations. The code observations (group delay) are delayed whereas the phase observations (phase delay) are advanced. The extent of ionization can be expressed by the Total Electron Content (TEC) which is typically expressed in TEC units (TECU). The propagation time of the code and phase observations in units of distance caused by the Slant Total Electron Content along the signal path in a first-order approximation can be written as:

$$I_{f,Code} = \frac{40.28}{f^2} \cdot STEC \tag{1}$$

$$I_{f,Phase} = -\frac{40.28}{f^2} \cdot STEC \tag{2}$$

where
$I_{f,Code}$ is the delay of the code observations in meters,
$I_{f,Phase}$ is the advance of the phase observations in meters,
f is the frequency of the signal in Hz divided by the factor $10^8$, and
STEC is the Slant Total Electron Content along the signal path in TECU.

The contribution of the higher orders, i.e. the residual error of the first-order approximation does not exceed a few centimeters generally.

Ionosphere Models

An ionosphere model provides the STEC along the signal path and, by using equations (1) and (2), code and phase observations can be corrected for the signal propagation time errors caused by the ionosphere. Those models either integrate along the signal path or use some simplifications. The most common and often used simplification is the Ionosphere Single Layer Model.

Ionosphere Single Layer Model

Figure 7:
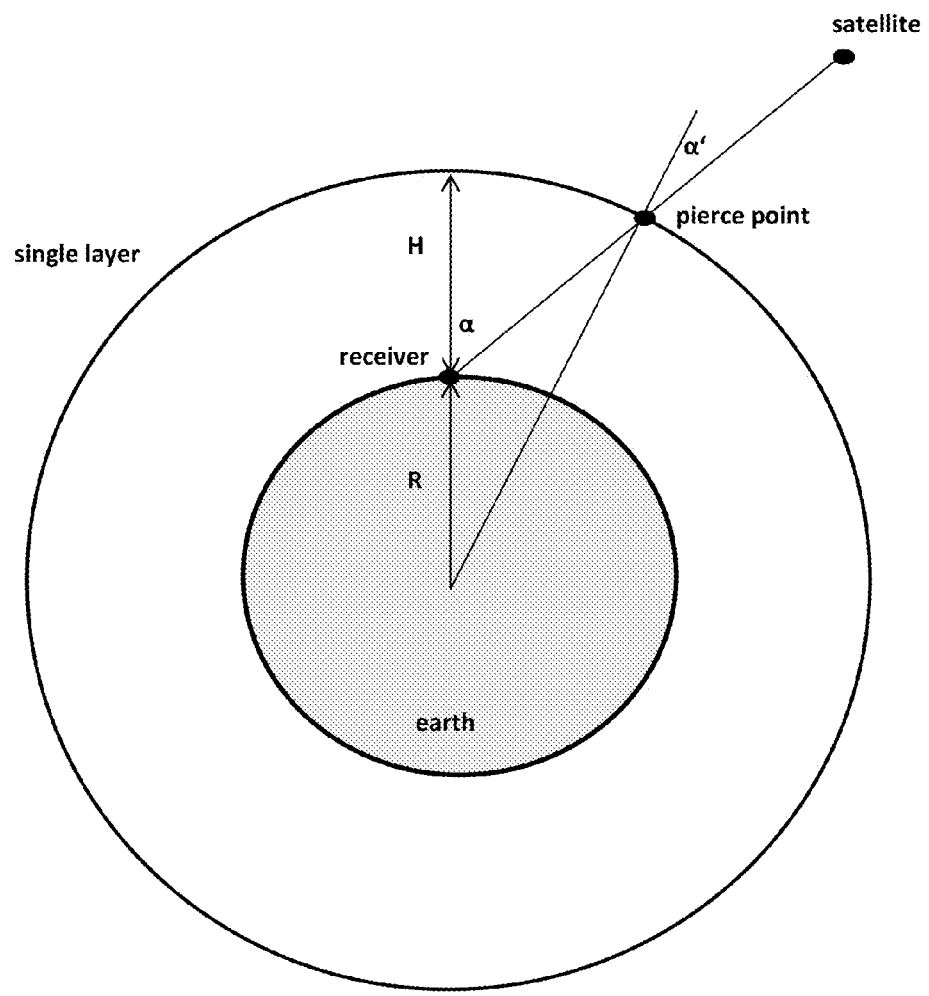
FIG. 7 schematically illustrates the underlying context of an ionosphere single layer model.

FIG. 7 schematically illustrates the geometry underlying an Ionosphere Single Layer Model (SLM). It concentrates the TEC of the ionospheric layer in an infinitesimal thin sphere layer at the layer height H. The signal path intersects that layer in the ionospheric pierce point and the vertical TEC for that pierce point is provided directly by the SLM. It is afterwards mapped to the STEC by means of an ionospheric mapping function which could be written as:

$$STEC = mf_{(\alpha')} \cdot VTEC = \frac{1}{\cos(\alpha')} \cdot VTEC \tag{3}$$

where
  $mf_{(\alpha')}$ is the ionospheric mapping function
  α' is the intersection angle at the pierce point as shown in FIG. 7 and
  VTEC is the vertical TEC at the pierce point.

The mapping function given implicitly by equation (3) is derived from the geometry given by FIG. 7. This is just one example for an ionospheric mapping functions, since there are also different ones (see for example Schaer S. (1999): "*Mapping and Predicting the Earth's Ionosphere Using the Global Positioning System*", Dissertation, Geodätisch-geophysikalische Arbeiten in der Schweiz, Vol. 59).

Parameter Estimation

Within a parameter estimation approach measurements, also called observations, are used to determine the parameters of a chosen model (see for example Strang G. and Borre K. (1997): "*Linear algebra, geodesy, and GPS*", Wellesley-Cambridge Press, Wellesley Mass., USA). A quite simple example would be the determination of a regression line whereas the sample points are the observations and the gradient and the y-intercept of the line are the estimated parameters. The relationship between the observations and the parameters are given by the linear observation equations; they are written as:

$$r = b - A \cdot x \quad (4)$$

where
  r is the vector of residuals
  A is the design matrix
  x is the vector of parameters
  b is the vector of observations In general, a parameter estimation approach determines the initially unknown parameters by minimizing the residuals. Thus, the residuals indicate afterwards how good the observations fit to estimated model. The matrix A is called design matrix because it describes how the parameters depend on the observations. A parameter estimation is designed well if every parameter could be estimated reliably from the available observations. There are different parameter estimation approaches available, as e.g. the least squares adjustment and the Kalman filter approach (see for example Strang G. and Borre K. (1997): "*Linear algebra, geodesy, and GPS*", Wellesley-Cambridge Press, Wellesley Mass., USA).

Variance Computation within the Parameter Estimation

If a model is determined by parameter estimation, the accuracy or more precisely the variance of the estimated model parameters can also be computed (see for example Strang G. and Borre K. (1997): "*Linear algebra, geodesy, and GPS*", Wellesley-Cambridge Press, Wellesley Mass., USA). The general equation is written as:

$$\Sigma_{xx} = s_0^2 \cdot Q_{xx} \quad (5)$$

where
  $\Sigma_{xx}$ is the variance matrix of the model parameters x,
  $Q_{xx}$ is the inverse of the normal equation matrix, and
  $s_0^2$ is the a posteriori variance of unit weight of the parameter estimation.

The normal equation matrix depends on the design matrix and reflects therefore also the design respectively the constellation of the available observations. The a posteriori variance of unit weight is computed from all of the observation residuals. Thus, the variance matrix and therefore the standard deviation of one model parameter are determined by the constellation of the available observations and the overall residuals.

Additionally, the theory of parameter estimation provides also equations to compute the variance of a function of the estimated parameters (see for example Strang G. and Borre K. (1997): "*Linear algebra, geodesy, and GPS*", Wellesley-Cambridge Press, Wellesley Mass., USA). Those equations are written as:

$$y = \alpha \cdot x + k \quad (6),$$

$$s_{yy}^2 = \alpha \cdot \Sigma_{xx} \cdot \alpha^T \quad (7)$$

where
  x is the vector of the model parameters,
  Y is a linear function of the model parameters,
  a is a row vector containing the derivations with respect to the model parameters,
  k is the constant summand of y (independent from x) and
  $s_{yy}^2$ is the variance of the function of the model parameters.

Ionosphere Models Derived from GNSS Observations

Ionosphere models can be determined by means of parameter estimation with GNSS observations. Typically, the geometric-free linear combination of the first and second frequency is used for the observation input. The code and phase observations of this linear combination used in the absolute positioning approach can be written as:

$$L_{GF} = \lambda_1 N_1 - \lambda_2 N_2 - \left( \frac{f_{1,GPS}^2}{f_1^2} - \frac{f_{1,GPS}^2}{f_2^2} \right) \cdot I_{1,GPS} + b_{GF}^r - b_{GF}^s + v_{GF} \quad (8)$$

$$P_{GF} = \left( \frac{f_{1,GPS}^2}{f_1^2} - \frac{f_{1,GPS}^2}{f_2^2} \right) \cdot I_1 + B_{GF}^r - B_{GF}^s + \varepsilon_{GF} \quad (9)$$

where
  $L_{GF}$ is the geometric-free carrier phase observation in meters,
  $f_1$ and $f_2$ are the frequencies of the $L_1$ and $L_2$ phase observations, respectively,
  $\lambda_1$ and $\lambda_2$ are the wavelengths of the $L_1$ and $L_2$ phase observations, respectively,
  $N_1$ and $N_2$ are the $L_1$ and $L_2$ integer ambiguities of the phase observations, respectively,
  $b_{GF}^s$ is the geometric-free satellite phase bias,
  $b_{FF}^r$ is the geometric-free receiver phase bias,
  $v_{GF}$ is the phase noise plus the phase multipath of $L_{GF}$,
  $I_{1,GPS}$ is the ionospheric signal delay for GPS $f_1$ in meters,
  $P_{GF}$ is the geometric-free code observation in meters,
  $B_{FF}^s$ is the geometric-free satellite code bias,
  $B_{GF}^r$ is the geometric-free receiver code bias, and
  $\varepsilon_{GF}$ is the code noise plus the code multipath of $P_{GF}$.

The linear combination is called geometric-free since all summands which are not frequency dependent vanish. Therefore, the satellite and station coordinates and the troposphere are not seen in equations (8) and (9). If a third frequency is available, a geometric-free linear combination can be composed by making use of it, i.e. it is no longer a requirement to use L1 and L2.

The ionospheric signal delay $I_{1,GPS}$ must generally be expressed by an ionosphere model, i.e. by a function of a number of unknowns describing the model. The parameter estimation determines these unknowns together with all other unknowns. These are the code and phase biases and depending on the estimation approach potentially also the ambiguities.

Global Ionosphere SLM Derived from GNSS Observations

A Global Ionosphere SLM expresses the global ionosphere by the VTEC values on a sphere layer. Thus, the ionospheric signal delay should be expressed by a function of the pierce point position and a number of unknowns describing the VTEC values on a sphere. In a more general sense, a function is needed which is able to provide values dependent on latitude and longitude. Spherical harmonics exactly solve this problem and are therefore often used in earth sciences to represent global fields; e.g. the global gravitation field and the global magnetic field are typically expressed in spherical harmonics. Although the observation equations (8) and (9) are geometric-free, the satellite and the receiver position are needed to compute the location of the pierce point (see equations (11) and (12) for details), whereas accuracies in the meter range are sufficient (this requirement can always be fulfilled by broadcast orbits, i.e. using orbital parameters transmitted in the satellite data message, and a point positioning based on code observations).

Spherical Harmonics

The spherical harmonics can be written as:

$$F_{(\Phi,\Lambda)} = \sum_{n=0}^{N_{max}} \sum_{m=0}^{n} [(C_{n,m} \cdot \cos(m\Lambda) + S_{n,m} \cdot \sin(m\Lambda)) \cdot P_{n,m(\Phi)}] \quad (10)$$

where $F_{(\Phi, \Lambda)}$ is the value of the spherical harmonics expansion for a dedicated point $\Phi$ and $\Lambda$ are the latitude and longitude of the dedicated point on the sphere, n and m are the degree (n) and order (m) of the spherical harmonics expansion, $N_{max}$ is the maximum degree of the spherical harmonics expansion, $c_{n,m}$ and $S_{n,m}$ are the coefficients of the spherical harmonics expansion, and $P_{n,m(\Phi)}$ are the Associated Legendre Polynomials.

The Associated Legendre Polynomials are known functions whereas the coefficients of the spherical harmonics expansion are initially unknown and have to be determined by the parameter estimation. The number of summands and therefore the resolution of the expansion are controlled by the chosen maximum degree.

Application to Global Ionosphere SLM Represented by Spherical Harmonics

If a global ionosphere SLM is represented by spherical harmonics (equation (10)), its coefficients $C_{n,m}$ and $S_{n,m}$ are determined by the parameter estimation. The resolution of the model is controlled by the number of these coefficients. That means by increasing the degree and order of the expansion (which corresponds to an increase of the number of coefficients), the resolution of the spherical harmonic model is also increased. However, the order and degree cannot be chosen arbitrarily because the number of available observations and the distribution of the GNSS reference stations have to ensure numerical stability within the estimation approach. For example, a 15 order and degree spherical harmonic model is typically used to estimate a global ionosphere SLM based on a global GNSS tracking network with 100 reference stations.

The expansion provided by equation (10), which is a function of the model parameters $C_{n,m}$ and $S_{n,m}$, gives the VTEC on the sphere layer. This means that, by using the equations (4) to (7), the standard deviation, which is the square root of the variance, of every VTEC value on the sphere layer can be computed. This standard deviation is therefore based on the constellation of the available observations, i.e. the pierce point distribution and the overall residuals. Related to ionospheric disturbances even in small areas, the ionosphere can be quite inhomogeneous. Therefore, the resolution of a spherical expansion could be suitable with respect to the global ionospheric activity but large residuals, i.e. large model errors with respect to the true ionosphere delay, can arise in dedicated areas nevertheless. According to the equations (4) to (7), those large residuals impact the standard deviation only in a global sense (i.e. $s_0$ increases slightly). Thus, the standard deviation given by equation (7) cannot represent the model accuracy properly at those regions. Moreover, the significance of the standard deviation is affected by another issue. In the GNSS parameter estimation, existing correlations could typically not be modeled correctly. Thus, the standard deviation derived from equations (4) to (7) is normally too optimistic by a factor of 2 to 10. Therefore, a standard deviation or more general an accuracy indicator which is significant and additionally based completely on regional accuracy information would be desirable.

Application to Arbitrary Global Ionosphere Models

The previous explanations are generally true for an arbitrary parameter estimation approach unless it is possible to keep the residuals homogenous globally. Alternative approaches, which must account for special regions that are additionally dependent on space and time, are possible. But they will come along with a significantly higher number of unknowns. This might be possible quite well in post processing approaches but it is very problematic for real time applications with limited bandwidth for data transmission. In this case, the transmission of one model update takes too long with respect to the validity period of the transmitted model.

An Ionosphere Accuracy Indicator Based on Precise Phase Residuals

First of all, an arbitrary global ionosphere model is determined by GNSS precise point positioning. The parameter estimation is generally based on the observations equations (8) and (9) whereas the concrete parameter estimation approach is also arbitrary. The residual of the phase equation (8) provides the error of the estimated ionosphere model with high accuracy if the ambiguities are fixed to their true integer values or if their float value is determined precisely and moreover the satellite and receiver phase biases are estimated with millimeter accuracy. The first condition can be assured by taking the already determined ambiguities from a second processor, see US 2012/162007 A1 for example. The second condition can be fulfilled within the parameter estimation as the bias parameters are constant over time in principle.

Figure 8:
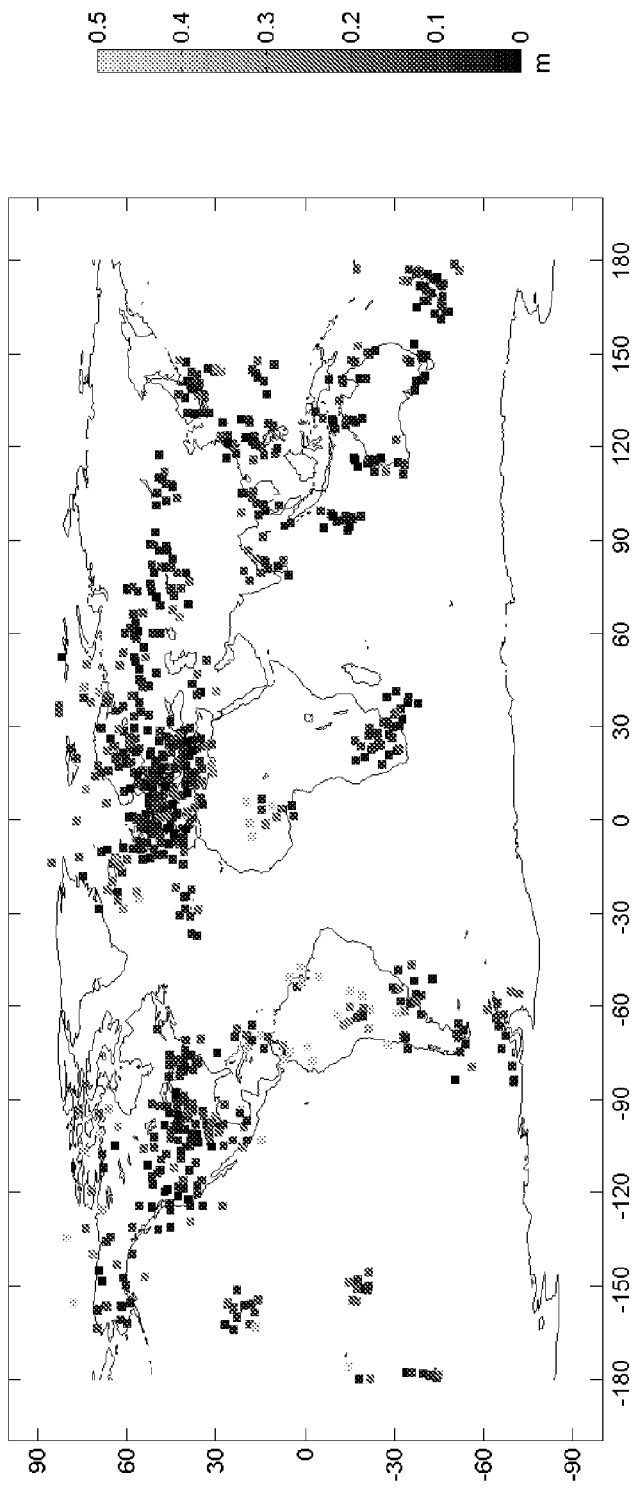
FIG. 8 exemplarily shows the phase residuals from the parameter estimation (absolute values, i.e. non-negative without regard to sign, in units: meters at the GPS L1 frequency) in one embodiment of the invention.
Figure 9:
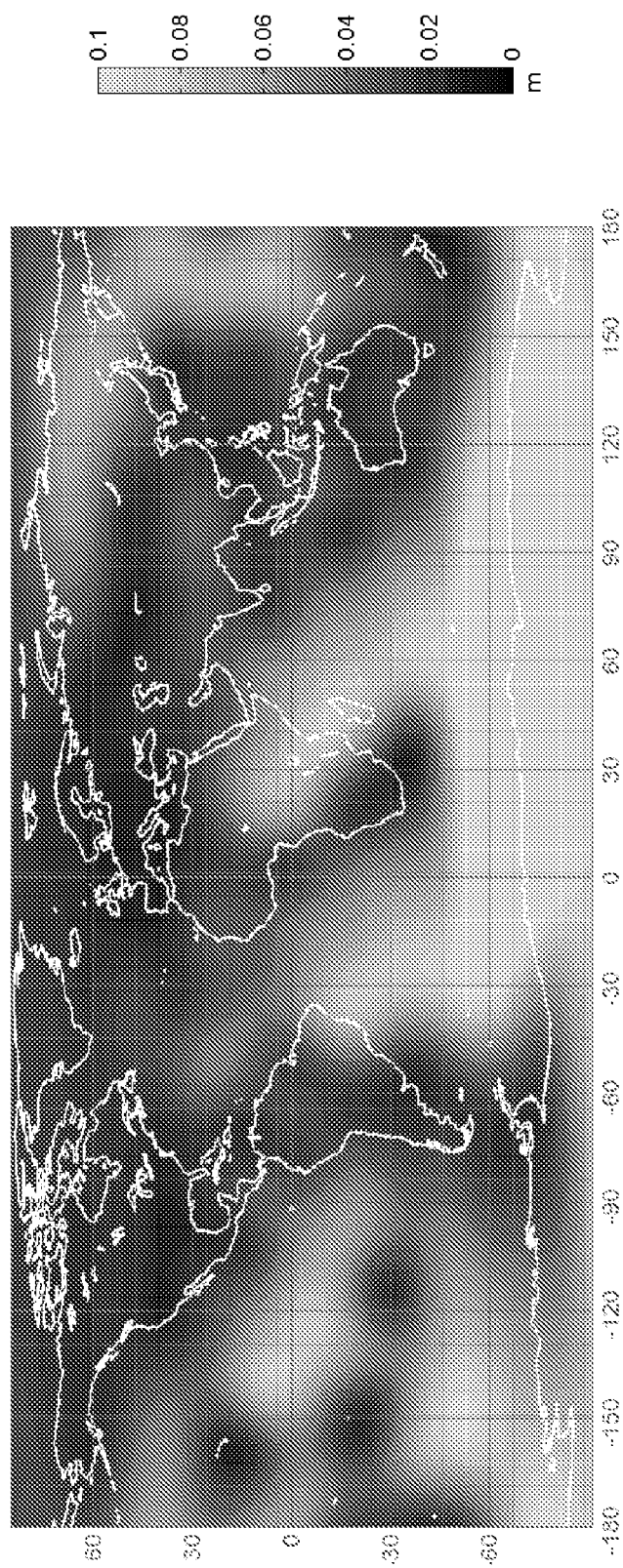
FIG. 9 exemplarily shows the standard deviation derived from equations (4) to (7) (in units: meters at the GPS L1 frequency), as will be explained below, in one embodiment of the invention.

The phase residuals of the parameter estimation, mapped to the vertical, are given exemplarily by FIG. 8. The standard deviation for a vertical signal path delay, derived from the equations (4) to (7), looks like FIG. 9. These figures illustrate the above-mentioned issues. The derived standard deviation simply indicates the constellation of the available observations (northern part of South America is indicated as good as North America/Europe whereas the residuals there are much larger). Moreover, the standard deviation is too optimistic in general (Note the different scale of the legend).

To overcome these drawbacks, an accuracy indicator for the estimated ionosphere model which is significant and additionally based completely on regional accuracy information can be derived. A suitable method based on a single layer ionosphere model is described in the following, in accordance with one embodiment of the invention.

1. Provide Pierce Points and Vertical Phase Residuals

Phase residuals with high accuracy are available after the parameter estimation. They represent quasi-true errors of the estimated ionosphere model with respect to the true ionosphere delay. For the corresponding observation link, the pierce point coordinates are computed and the phase residual are mapped to the vertical. This is possible even if the parameter estimation approach itself is not based on a single layer model. An illustration of the SLM model with a pierce point of an observation link is already given by FIG. 7. The equations to compute the pierce point coordinates and the intersection angle are:

$$\vec{X}_{(\mu)} = \vec{X}_{Rec} + \mu \cdot \vec{X}_{Link} \quad (11a)$$

-continued $$\begin{bmatrix} x \\ y \\ z \end{bmatrix} = \begin{bmatrix} x_{Rec} \\ y_{Rec} \\ z_{Rec} \end{bmatrix} + \mu \cdot \begin{bmatrix} x_{Sat} - x_{Rec} \\ y_{Sat} - y_{Rec} \\ z_{Sat} - z_{Rec} \end{bmatrix} \quad (11b)$$

$$x^2 + y^2 + z^2 = (R + H)^2 \quad (12)$$

$$\cos(\alpha') = \frac{\vec{X}_{Link} \cdot \vec{X}_{PPt}}{|\vec{X}_{Link}| \cdot |\vec{X}_{PPt}|} \quad (13)$$

where $\vec{X}_{(\mu)}$ is the position vector of a point located on the receiver satellite link, $\vec{X}_{Rec}$ is the position vector of the receiver, $\vec{X}_{Link}$ is the difference vector of the position vectors of the satellite and the receiver, $\vec{X}_{PPt}$ is the position vector of the pierce point, R+H is the radius of the ionospheric sphere and α' is again the intersection angle at the pierce point.

By inserting equation (11) into equation (12), a quadratic equation is produced which has a positive and a negative solution for μ, whereas the positive μ provides the wanted position vector of the pierce point. The intersection angle is afterwards obtained by the dot product equation (13).

2. Compute a Residual Based RMS for Grid Points on the Ionosphere Layer

After step "1.", an equidistant grid (with a grid distance of 5° at the equator, for example) is placed on the ionosphere single layer. For every grid point, the vertical phase residuals in the sphere cap of influence are collected. That is, residuals are selected if the spherical distance between the corresponding grid point and the considered grid point is shorter than a set limit (threshold distance) (see FIG. 10), whereas the spherical distance is given by:

$$\text{dist} = (R + H) \cdot \arccos\left(\frac{\vec{X}_{Grid} \cdot \vec{X}_{PPt}}{|\vec{X}_{Grid}| \cdot |\vec{X}_{PPt}|}\right) \quad (14)$$

where dist is the spherical distance between the grid point and a pierce point and $\vec{X}_{Grid}$ is the position vector of the grid point.

Figure 10:
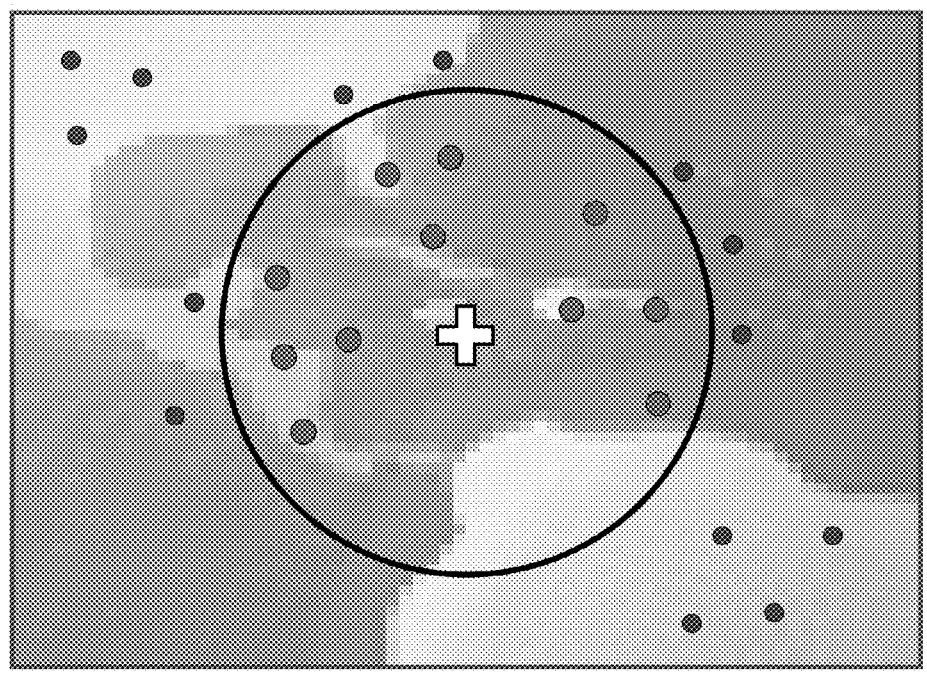
FIG. 10 illustrates the selection of pierce points (dots) for a dedicated grid point (cross) in one embodiment of the invention, wherein only if the spherical distance to a pierce point is shorter than the radius of influence (circle), it is selected (large dots)

In FIG. 10, the selection of pierce points (dots) for a dedicated grid point (cross). Only if the spherical distance to a pierce point is shorter than the radius of influence (circle), it is selected (large dots).

If the number of available pierce points, and respectively residuals, is sufficient, a weighted RMS of the vertical residuals is computed for that grid point:

$$wRMS = \sqrt{\frac{\sum w_i \cdot r_i^2}{\sum w_i}} \quad (15)$$

$$w_i^{-1} = \text{dist}^2 \cdot s_r^2 \quad (16)$$

where wRMS is the weighted root mean square of the residuals r, $w_i$ is the weight of a residual and $s_r^2$ is the variance of a residual (computed within the parameter estimation).

Moreover, a scale factor for the standard deviation, derived from equations (7) to (9), to get the RMS can be computed for that grid point:

$$\text{scale} = wRms/s \quad (17)$$

where scale is the scale factor to get the weighted RMS from the standard deviation and s is standard deviation, derived from equations (7) to (9).

After the processing of all grid points, a weighted mean value of those scale factors is computed:

$$wScale = \frac{\sum n_i \cdot \text{scale}_i}{\sum n_i} \quad (18)$$

where wScale is the weighted mean value of the scale factor to get the weighted RMS and $n_i$ is the number of residuals contributing to a weighted RMS (15).

Figure 11:
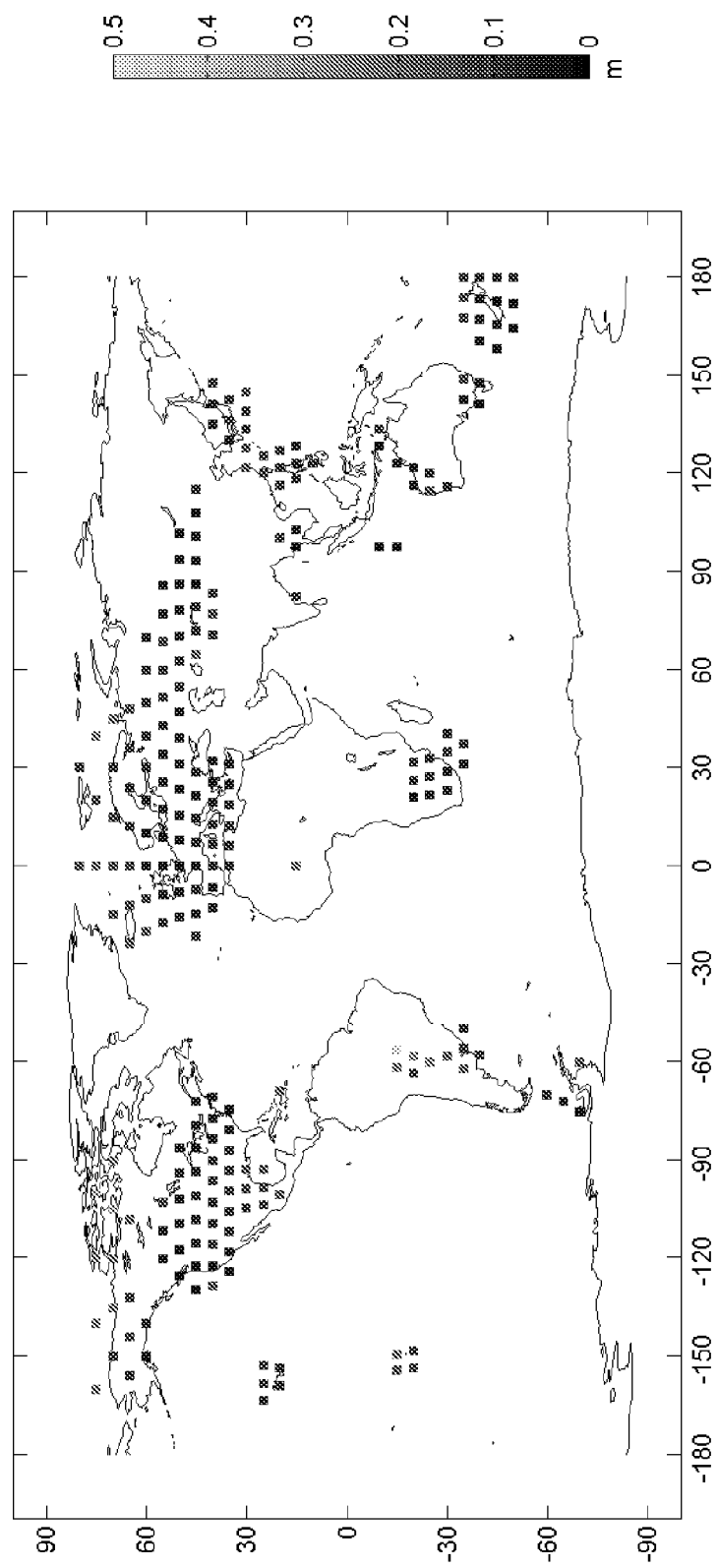
FIG. 11 exemplarily shows the weighted RMS computed from residuals mapped to the vertical in a global grid (in units: meters at the GPS L1 frequency), in one embodiment of the invention, wherein the RMS for a grid point can only be computed if enough pierce points are in the radius of influence.

FIG. 11 shows the weighted RMS of the residuals mapped to the vertical for the grid points. It is apparent that the RMS could only be computed in well observed regions (see also FIG. 8).

3. Grid Points with Sparse or without Residuals

For the grid points which have no phase residuals at all, wScale is used to scale the standard deviation, derived from the equations (7) to (9), and provide therefore an accuracy indicator (accuracy information). Since this accuracy indicator is not based on any residuals, it is probably too optimistic. Therefore, it is scaled additionally by second scale factor (greater than 1). This second scale factor is reduced if there are a few residuals available for that grid point. If there are some more observations, an RMS can be computed but due to the small number of residuals it is only of limited significance. For those grid points, the RMS is averaged with the scaled standard deviation. Altogether, a general expression for the accuracy indicator can be written as:

$$AI = w_{s(n)} \cdot s \cdot wScale \cdot \text{factor}_{(n)} + (1 - w_{s(n)}) \cdot wRms \quad (19)$$

where

AI is the accuracy indicator in the considered grid point, $w_{s(n)}$ is the contribution of the scaled standard deviation, n is the number of available pierce points, each with a corresponding residual, s is the standard deviation derived from equations (7) to (9) and $\text{factor}_{(n)}$ is the second scale factor to avoid too optimistic values for AI.

Possible values for $w_s$ and factor, depending on the number of available residuals are given exemplarily in the table. The value of factor can be set to an arbitrary value for n>14 due to $w_s$ being 0.

| n | 0 | 1 | 2 | 3 | 4 | 5 | 6 | 7 | 8 | 9 | 10 | 11 | 12 | 13 | 14 | >14 |
|---|---|---|---|---|---|---|---|---|---|---|----|----|----|----|----|-----|
| factor | 3.0 | 2.7 | 2.4 | 2.1 | 1.8 | 1.6 | 1.4 | 1.3 | 1.2 | 1.1 | 1.0 | 1.0 | 1.0 | 1.0 | 1.0 | |
| $w_s$ | 1.0 | 1.0 | 1.0 | 1.0 | 1.0 | 1.0 | 0.9 | 0.8 | 0.7 | 0.6 | 0.5 | 0.4 | 0.3 | 0.2 | 0.1 | 0 |

Figure 12:
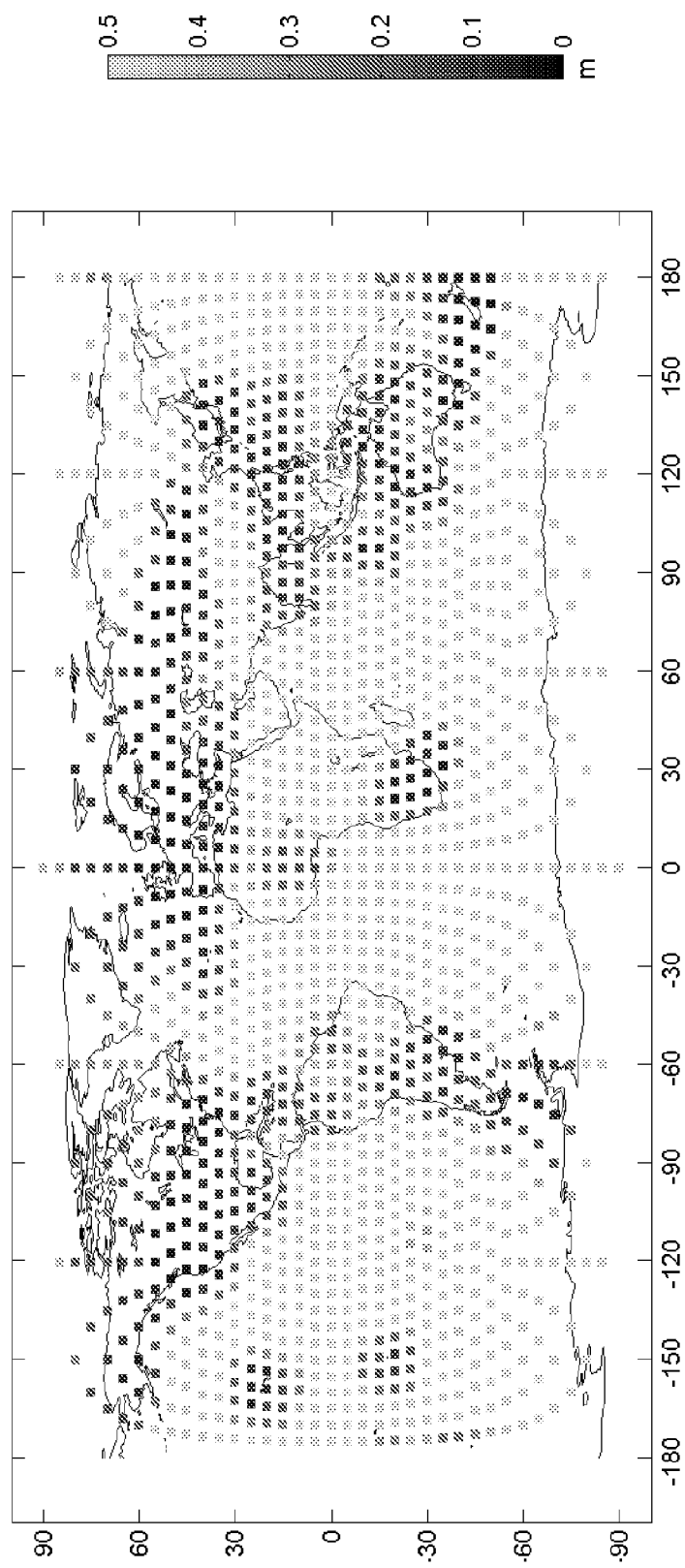
FIG. 12 exemplarily shows the accuracy indicator given in the equidistant grid points (in units: meters at the GPS L1 frequency), in one embodiment of the invention.

By applying equation (19), an accuracy indicator for every grid point is obtained. For all the regions with enough pierce points, the accuracy indicator is the residual based RMS. For all the regions that are not observed at all, the accuracy indicator cannot be based on residuals and therefore a quite pessimistic value is provided. An already quite reasonable changeover is realized in the transition regions. FIG. 12 shows the accuracy indicator computed by equation (19) for all grid points.

4. Spherical Harmonics Representation for the Accuracy Indicator

Figure 13:
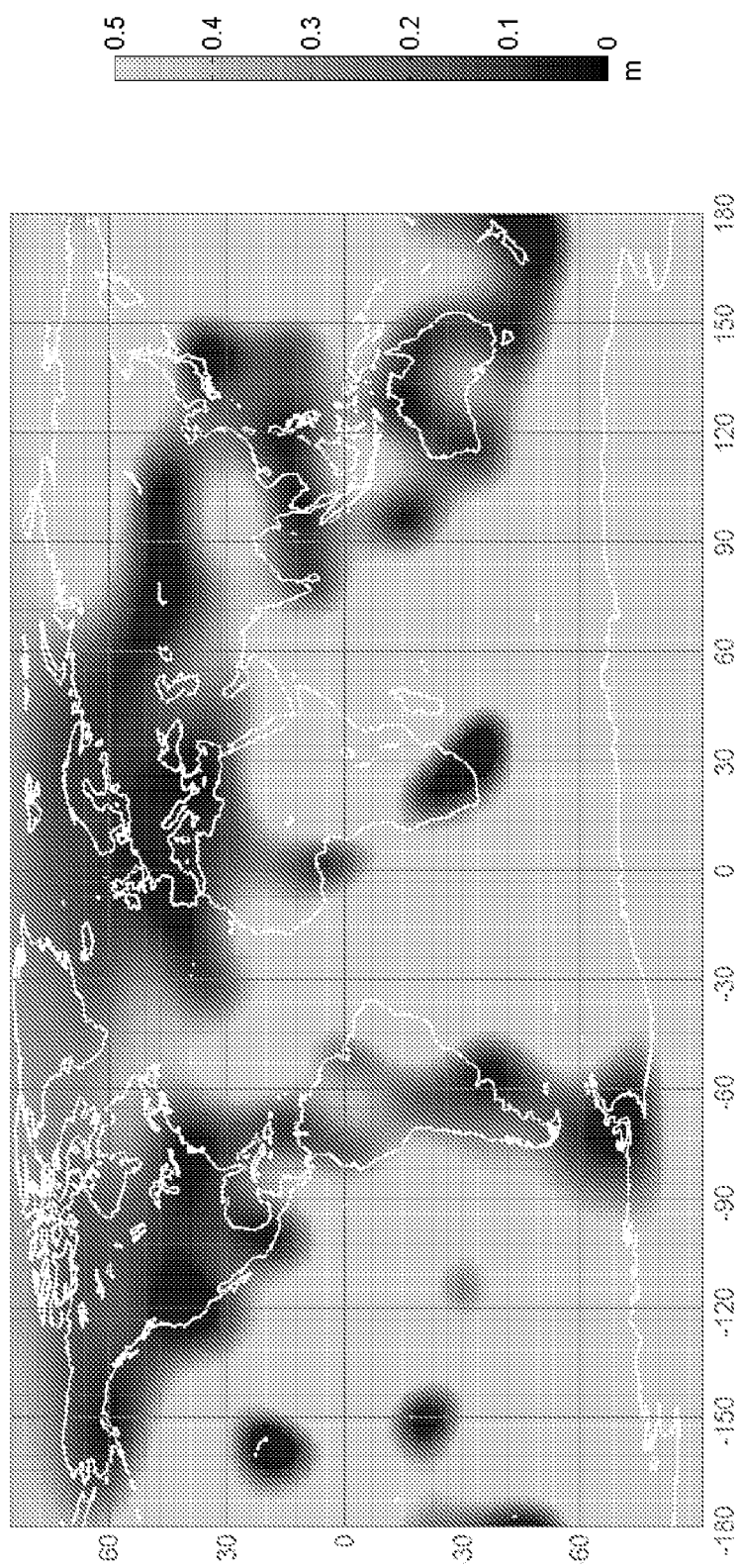
FIG. 13 exemplarily shows the accuracy indicator given by spherical harmonics (in units: meters at the GPS L1 frequency), in one embodiment of the invention.

Finally, the accuracy indicators of all the grid points are input into a parameter estimation step to determine coefficients of a spherical harmonics expansion (However, the invention is not limited to determining coefficients of a spherical harmonics expansion. Other type of expansions may be used). By doing so, the accuracy indicator given initially in the grid points only is smoothed and interpolated to a global representation. Thus, by equation (10), the accuracy indicator can be computed everywhere on the sphere layer. This is illustrated by FIG. 13.

The accuracy indicator represented in spherical harmonics is computed directly after the ionosphere model parameter estimation by the processing entity (or "ionosphere processor"). The associated processing occurs together with other processor tasks on a server collecting also the observation data of the global tracking network. Afterwards, the estimated ionosphere model and its accuracy indicator are transmitted to a user or its rover station respectively. For example, the estimated ionosphere model and its accuracy indicator may be transmitted in the form of coefficients of a spherical harmonics expansion. This general workflow is illustrated by the general scheme of FIGS. 14a and 14b, whereas the flowchart describing the computation of the accuracy indicator is given by FIG. 15.

Figure 14A:
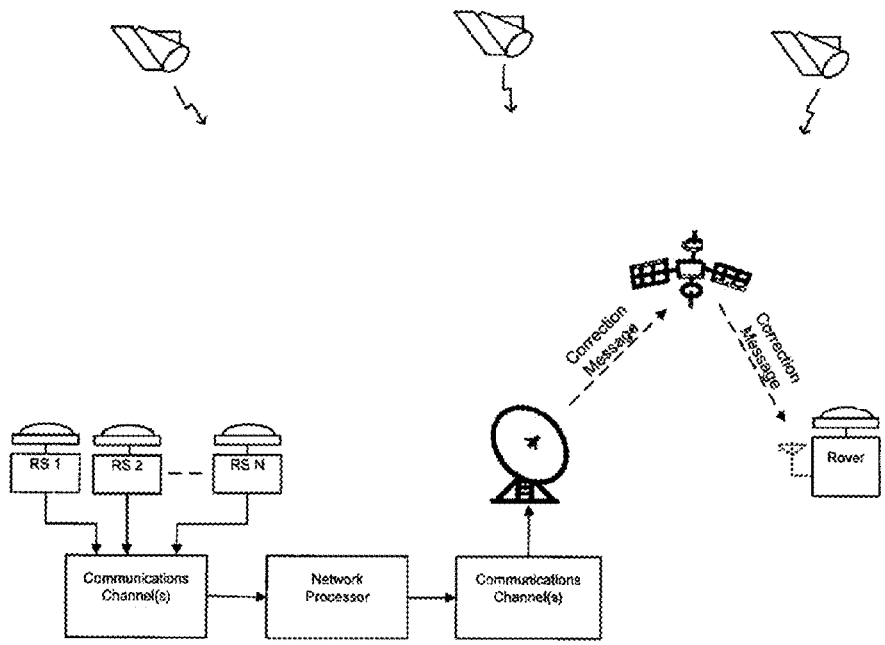
FIG. 14a shows the general processing flow chart, in one embodiment of the invention.
Figure 15:
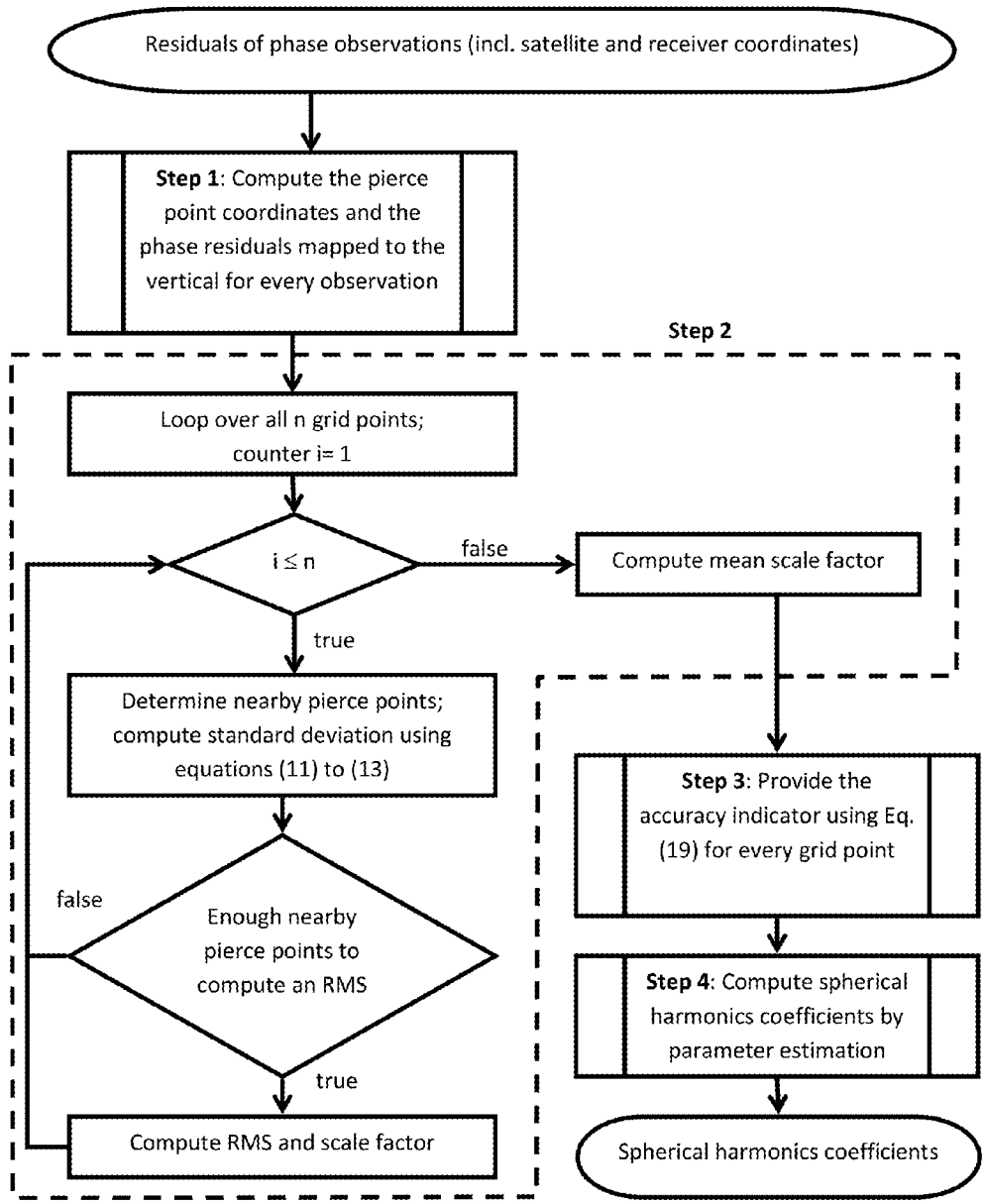
FIG. 15 is a flow chart illustrating the computation of the accuracy indicator within the ionosphere processor (processing entity), in one embodiment of the invention.

In particular, FIG. 14a shows that the estimated ionosphere model and its accuracy indicator may be sent to a rover as part of a so-called correction message. The invention is however not limited to sending the accuracy information to a rover. The accuracy information may alternatively, or additionally, be transmitted to a server (or set of servers) so as to be further processed. Thus, the statement according to which "the accuracy information is usable in a GNSS positioning system for estimating a position of a rover" does not imply that the accuracy information is necessarily used for that purpose. Rather, it means that the information is suitable to be used for that purpose. The accuracy information may also be transmitted and used in a network to compute correction information associated with reference stations, etc.

Furthermore, although FIG. 14a shows that the correction message may be sent through a satellite link to a rover, the invention is not limited in that respect. The invention also covers embodiments wherein the correction message is transmitted via the Internet, any computer network, or any suitable radio link.

Usage of the Ionosphere Model and the Accuracy Information at Rover Stations

This section explains how the accuracy information (e.g., accuracy indicator) may be used for improving the rover positioning, in one embodiment of the invention. In US 2013/0044026, the generation (and subsequent use) of synthetic base station observation data is described. Within the generation, an ionosphere model is used and therefore the synthetic observation data generated for L1 and L2 contains ionospheric propagation errors (before the invention described in US 2013/0044026, synthetic base station observation data had to be generated without an ionosphere model; thus the data generated for L1 and L2 was in fact ionospheric-free).

Figure 14B:
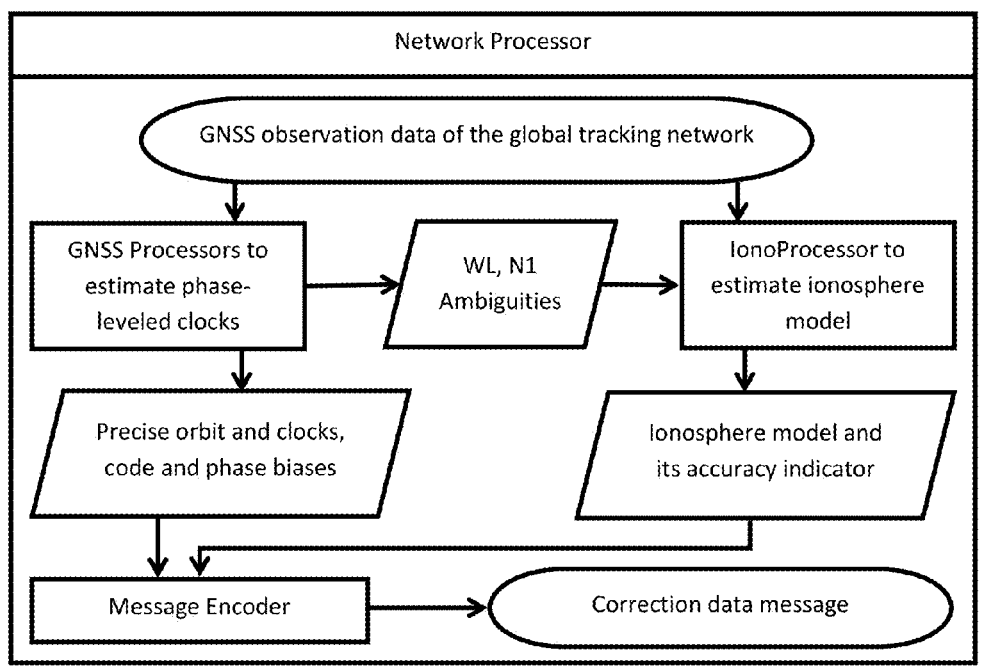
FIG. 14b shows the flow chart of a method performed by a network processor, in one embodiment of the invention.

As depicted in FIG. 14b, precise orbit and clocks, code and phase biases as well as the ionosphere model and its accuracy indicator are transmitted to a rover station. This information is used at the rover to generate synthetic base station data for the position of the rover station. This data is considered to be equivalent to reference station data and relative positioning processing is performed at the rover station relative to this synthetic reference (since the reference station data is completely synthetic, it is in fact considered a PPP approach).

Within the relative positioning processing, three independent Kalman filters with different linear combinations are used to estimate ambiguities (see for example U.S. Pat. No. 7,432,853 B2). In a subsequent step of the processing, these ambiguity estimates are combined by a filter combiner as a preparation step for the actual ambiguity fixing. In general, two of the three filters, each corresponding to an ambiguity for a specific linear combination, are sufficient to determine fixed ambiguities for both phase observations (L1 and L2), i.e. the system is sufficiently determined with two filters, and using all three filters would become over-determined. The first filter uses a linear combination which is geometric-free and ionospheric-free, the second filter uses the ionospheric-free linear combination and the third one uses the geometric-free linear combination (called the ionosphere filter). As apparent from formula (8), the ionosphere filter has to set up unknowns, as defined by filter states, not only for the ambiguities but also for the ionosphere itself.

If the synthetic base station data is generated ionospheric-free, there will be no a priori information for the ionosphere states available. Ionosphere and ambiguity state need to converge from approximations and therefore the ambiguity states do not converge quickly. Thus, the ambiguity estimates of the ionosphere filter are heavily down-weighted in the filter combiner (as previously mentioned, the estimates of the other two filters are sufficient for the ambiguity fixing in a later step of the process).

By using an ionosphere model, the generated synthetic base station data contains ionospheric propagation errors. Therefore, this provides a quite good approximation for the ionosphere available whereas the quality of the approximation is indicated by the accuracy indicator. In the ionosphere filter, the accuracy indicator 113 is used to control the noise model of the ionosphere state. If a good approximation is indicated this is reflected by the noise model of the ionosphere state, i.e. the estimate of the ionosphere state is almost constrained to its approximation, and therefore the ambiguity converges more rapidly. The ambiguity estimates of the ionosphere filter contribute substantially to the filter combiner and the subsequent ambiguity fixing is significantly accelerated. With a decreased quality indicator, the contribution of the ionosphere filter and the extent of the acceleration also decrease. Only in the extreme case, if the ionosphere model is indicated as very bad, does the contribution and the acceleration becomes zero and the performance revert back to the original scenario with ionospheric-free base station data, as previously mentioned.

Figure 16:
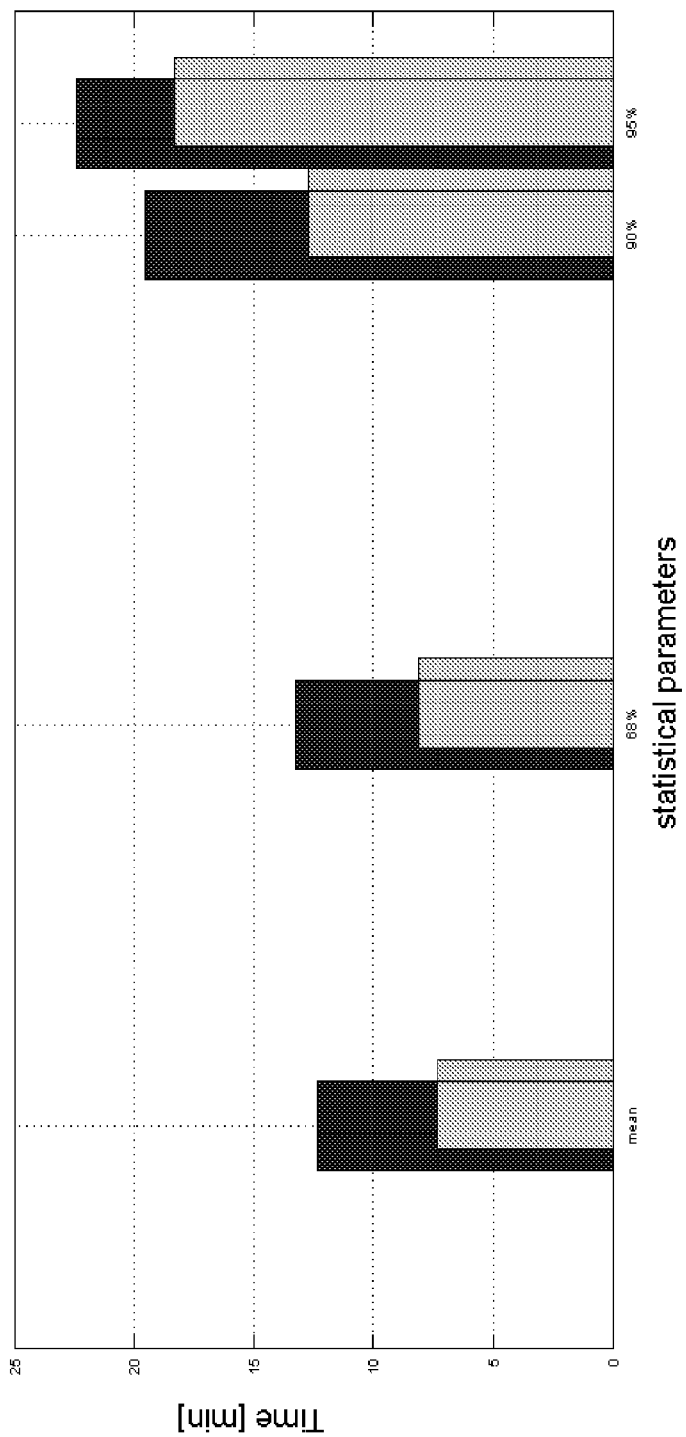
FIG. 16 illustrates exemplarily the comparison of the convergence times of rover stations in Europe with and without an ionosphere model and its accuracy.

Therefore, in some embodiments of the present invention, it is necessary to provide both an ionosphere model and its accuracy to the methods and apparatus for the rover GNSS data processing. FIG. 16 exemplarily compares the convergence times of rover stations in Europe with and without an ionosphere model and its accuracy. It confirms the expected reduction of the convergence times via experiment using real data. Especially, FIG. 16 shows the comparison of the convergence times of rover stations in Europe with (gray) and without an ionosphere model and its accuracy (black). By introducing the ionosphere information, the mean convergence time decreased from 12 minutes (black) to 7 minutes (gray) which is an improvement of about 40%. Also in the three percentile scenarios the improvement is significant, e.g. the 90% percentile shows that with applying the ionosphere information the convergence time is shorter than 13 minutes in 90% of the test runs (gray). The corresponding convergence time is 20 minutes without applying ionosphere information (black), i.e. the improvement for the 90% percentile is 35%.

There is a vast spectrum of industrial high accuracy positioning applications that currently employ rovers using traditional GNSS positioning methods that will benefit from the improved convergence time that the present invention will provide to GNSS precise point positioning methods. These include, but are not limited to: automatic positioning of agricultural machinery, civil construction machinery, and mining machinery; geodetic survey equipment; marine survey equipment; photogrammetry (including airborne platforms both manned and unmanned, the latter referred to as UAVs, unmanned aerial vehicles, or drones); GIS (geographic information system) equipment; and position monitoring systems (such as earthquake detection, bridge monitoring, and dam deformation).

The invention claimed is:

1. Method, carried out by a computer or set of computers, for generating accuracy information for an ionosphere model calculated using a parameter estimation procedure based on phase observations made using a plurality of ground stations, wherein
   each phase observation is obtained from at least two signals transmitted from a satellite to a ground station, each of the at least two signals having a different frequency, and
   the accuracy information is usable in a GNSS positioning system for estimating a position of a rover,
   the method comprising the steps of:
   for each of at least some of the phase observations having fixed or converged ambiguities,
   obtaining phase residual information of the parameter estimation procedure; and
   computing coordinates of a pierce point on a sphere around the earth, the sphere being defined by an ionosphere single layer model, wherein the coordinates indicate where the at least two signals from which the phase observation has been obtained pierce the sphere;
   mapping, for each pierce point, the phase residual information of the corresponding phase observation to the vertical at the pierce point to generate vertical residual information;
   for each of at least some of the points of an equidistant grid on the sphere, each point being hereinafter referred to as "grid point", identifying pierce points within a threshold distance from the grid point on the sphere;
   selecting grid points for which the number of identified pierce points exceeds a threshold number;
   computing, for each selected grid point,
      vertical accuracy information at the selected grid point based on the vertical residual information of the identified pierce points, and
      a scale factor based on the vertical accuracy information computed for the selected grid point; and
   generating the accuracy information for the ionosphere model based on
      the vertical accuracy information computed for the selected grid points, and
      an overall scale factor computed based on the computed scale factors.

2. Method of claim 1, wherein the ionosphere model provides a slant total electron content along a signal path through the ionosphere.

3. Method of claim 1, wherein the ionosphere single layer model concentrates the phase residual information of the parameter estimation procedure mapped to a vertical on the sphere.

4. Method of claim 1, wherein each phase observation is obtained from two of the at least two signals using a geometric-free linear combination.

5. Method of claim 1, wherein the vertical accuracy information is a weighted root mean square computed from vertical residual information of the identified pierce points.

6. Method of claim 1, wherein generating the accuracy information comprises:
   computing, for each of all grid points of the equidistant grid, accuracy information based on the vertical accuracy information and the overall scale factor;
   computing coefficients of a functional expansion using a parameter estimation based on the accuracy information of each grid point to generate accuracy information covering the sphere.

7. Method of claim 6, wherein the step of computing accuracy information for each of all grid points of the equidistant grid comprises:
   if the number of identified pierce points for the grid point is smaller than a first threshold number, computing the accuracy information by scaling a standard deviation of the ionosphere model at the grid point using at least the overall scale factor,
   if the number of identified pierce points for the grid point is larger than a second threshold number, using the vertical accuracy information of the grid point as the accuracy information, and
   if the number of identified pierce points for the grid point is larger than or equal to the first threshold number and smaller than or equal to the second threshold number, computing the accuracy information by using a transition function between the vertical accuracy information of the grid point and the scaled standard deviation of the ionosphere model at the grid point,
   wherein the first threshold number is smaller than the second threshold number.

8. Method of claim 7, wherein the accuracy information is computed using the following formula:

$$AI = w(n) \cdot s \cdot wScale\text{-}factor(n) + (1-w(n)) \cdot wRMS,$$

wherein
   AI is the accuracy information,
   s is the standard deviation of the ionosphere model at the grid point,
   wScale is the overall scale factor,
   wRMS is the vertical accuracy information of the grid point,
   n denotes the number of identified pierce points for the grid point,
   n1 denotes the first threshold number,
   n2 denotes the second threshold number,
   $w(n)=1$ if $n \le n1$,
   $w(n)=0$ if $n>n2$,
   $0<w(n)<1$ if $n1 \le n \le n2$,
   $1 \le factor(n) \le 3$ if $n \le n2$.

9. Method of claim 7, wherein the accuracy information is computed using the following formula:

$$AI = w(n) \cdot s \cdot wScale \cdot factor(n) + (1-w(n)) \cdot wRMS,$$

wherein
AI is the accuracy information,
s is the standard deviation of the ionosphere model at the grid point,
wScale is the overall scale factor,
wRMS is the vertical accuracy information of the grid point,
n denotes the number of identified pierce points for the grid point,
n1 denotes the first threshold number,
n2 denotes the second threshold number,
$w(n)=1$ if $n<n1$,
$w(n)=0$ if $n>n2$,
$0<w(n)<1$ if $n1 \le n \le n2$,
$1 \le factor(n) \le 1.5$ if $n \le n2$.

10. A non-transitory computer readable medium having a computer program stored thereon, the computer program comprising computer-executable instructions configured, when executed on a computer, to cause the computer to carry out the method according to claim 1.

11. Processing entity, for generating accuracy information for an ionosphere model calculated using a parameter estimation procedure based on phase observations made using a plurality of ground stations, wherein
each phase observation is obtained from at least two signals transmitted from a satellite to a ground station, each of the at least two signals having a different frequency, and
the accuracy information is usable in a GNSS positioning system for estimating a position of a rover,
the processing entity comprising:
an obtaining unit configured to, for each of at least some of the phase observations having fixed or converged ambiguities,
obtain phase residual information of the parameter estimation procedure; and
compute coordinates of a pierce point on a sphere around the earth, the sphere being defined by an ionosphere single layer model, wherein the coordinates indicate where the at least two signals from which the phase observation has been obtained pierce the sphere;
a mapping unit configured to map, for each pierce point, the phase residual information of the corresponding phase observation to the vertical at the pierce point to generate vertical residual information;
an identifying unit configured to, for each of at least some of the points of an equidistant grid on the sphere, each point being hereinafter referred to as "grid point", identify pierce points within a threshold distance from the grid point on the sphere;
a selecting unit configured to select grid points for which the number of identified pierce points exceeds a threshold number;
a computing unit configured to compute, for each selected grid point, vertical accuracy information at the selected grid point based on the
vertical residual information of the identified pierce points, and a scale factor based on the vertical accuracy information computed for the selected grid point; and
a generating unit configured to generate the accuracy information for the ionosphere model based on the vertical accuracy information computed for the selected grid points and an overall scale factor computed based on the computed scale factors.

12. Processing entity of claim 11, wherein the ionosphere model provides a slant total electron content along a signal path through the ionosphere.

13. Processing entity of claim 11, wherein the ionosphere single layer model concentrates the phase residual information of the parameter estimation procedure mapped to a vertical on the sphere.

14. Processing entity of claim 11, wherein each phase observation is obtained from two of the at least two signals using a geometric-free linear combination.

15. Processing entity of claim 11, wherein the vertical accuracy information is a weighted root mean square computed from vertical residual information of the identified pierce points.

16. Processing entity of claim 11, wherein the overall scale factor is a weighted mean of the scale factors.

17. Processing entity of claim 11, wherein the generating unit is further configured to:
compute, for each of all grid points of the equidistant grid, accuracy information based on the vertical accuracy information and the overall scale factor; and
compute coefficients of a functional expansion using a parameter estimation based on the accuracy information of each grid point to generate accuracy information covering the sphere.

18. Processing entity of claim 17, wherein generating unit is further configured to:
if the number of identified pierce points for the grid point is smaller than a first threshold number, compute the accuracy information by scaling the standard deviation of the ionosphere model at the grid point using at least the overall scale factor,
if the number of identified pierce points for the grid point is larger than a second threshold number, use the vertical accuracy information of the grid point as the accuracy information, and
if the number of identified pierce points for the grid point is larger than or equal to the first threshold number and smaller than or equal to the second threshold number, compute the accuracy information by using a transition function between the vertical accuracy information of the grid point and the scaled standard deviation of the ionosphere model at the grid point,
wherein the first threshold number is smaller than the second threshold number.

19. Processing entity of claim 18, wherein the generating unit is further configured to compute the accuracy information using the following formula:

$$AI = w(n) \cdot s \cdot wScale \cdot factor(n) + (1-w(n)) \cdot wRMS,$$

wherein
AI is the accuracy information,
s is the standard deviation of the ionosphere model at the grid point,
wScale is the overall scale factor,
wRMS is the vertical accuracy information of the grid point,
n denotes the number of identified pierce points for the grid point,
n1 denotes the first threshold number,
n2 denotes the second threshold number,
$w(n)=1$ if $n<n1$,
$w(n)=0$ if $n>n2$,
$0<w(n)<1$ if $n1 \le n \le n2$,
$1 \le factor(n) \le 3$ if $n \le n2$.

20. Processing entity of claim 18, wherein the generating unit is further configured to compute the accuracy information using the following formula:

$$AI = w(n) \cdot s \cdot wScale \cdot factor(n) + (1-w(n)) \cdot wRMS,$$

wherein
AI is the accuracy information,
s is the standard deviation of the ionosphere model at the grid point,
wScale is the overall scale factor,
wRMS is the vertical accuracy information of the grid point,
n denotes the number of identified pierce points for the grid point,
n1 denotes the first threshold number,
n2 denotes the second threshold number,
$w(n)=1$ if $n<n1$,
$w(n)=0$ if $n>n2$,
$0<w(n)<1$ if $n1 \leq n \leq n2$,
$1 \leq factor(n) \leq 1.5$ if $n \leq n2$.

* * * * *